United States Patent
Kim et al.

(10) Patent No.: US 9,530,453 B2
(45) Date of Patent: Dec. 27, 2016

(54) APPARATUS, METHOD, AND COMPUTER-READABLE RECORDING MEDIUM FOR CREATING AND REPRODUCING LIVE PICTURE FILE

(71) Applicant: Samsung Electronics Co., Ltd., Suwon-si, Gyeonggi-do (KR)

(72) Inventors: Do-Hyeon Kim, Suwon-si (KR); Dong-Chang Lee, Suwon-si (KR); Seong-Taek Hwang, Pyeongtaek-si (KR); Dong-Hyuk Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 14/211,366

(22) Filed: Mar. 14, 2014

(65) Prior Publication Data
US 2014/0286626 A1 Sep. 25, 2014

(30) Foreign Application Priority Data

Mar. 21, 2013 (KR) ........................ 10-2013-0030481

(51) Int. Cl.
| | |
|---|---|
| *H04N 5/76* | (2006.01) |
| *G11B 27/031* | (2006.01) |
| *G11B 27/034* | (2006.01) |
| *G11B 27/30* | (2006.01) |
| *G11B 20/00* | (2006.01) |
| *H04N 1/32* | (2006.01) |

(52) U.S. Cl.
CPC ....... *G11B 27/031* (2013.01); *G11B 20/00086* (2013.01); *G11B 27/034* (2013.01); *G11B 27/3027* (2013.01); *H04N 1/32128* (2013.01); *H04N 2201/3249* (2013.01); *H04N 2201/3264* (2013.01)

(58) Field of Classification Search
CPC ............... G11B 27/031; G11B 27/3027; G11B 20/00086; G11B 27/034; H04N 2201/3264; H04N 2201/3249; H04N 1/32128
USPC ....................................................... 386/278
See application file for complete search history.

(56) References Cited

U.S. PATENT DOCUMENTS

| | | | |
|---|---|---|---|
| 7,343,559 B1* | 3/2008 | Fujita et al. | 715/733 |
| 2007/0061133 A1* | 3/2007 | Ohwaki | G10L 21/0272 704/214 |
| 2008/0129758 A1* | 6/2008 | Fox et al. | 345/661 |

(Continued)

FOREIGN PATENT DOCUMENTS

| | | |
|---|---|---|
| EP | 1 117 047 A1 | 7/2001 |
| KR | 10-2009-0119018 A | 11/2009 |
| WO | 2006073859 A2 | 7/2006 |

*Primary Examiner* — William Tran
(74) *Attorney, Agent, or Firm* — Jefferson IP Law, LLP

(57) ABSTRACT

An apparatus for reproducing an image file and outputting audio data related to the image file at the same time is provided. The apparatus includes an audio editor configured to edit audio data having a predetermined time length in order to create edited audio data, and an encoder in configured to encode image data and the audio data edited by the audio editor in order to create a live picture file, wherein the live picture file includes at least one of an image data area including the image data, additional data header area including information related to additional data including the audio data, and an audio data area including the edited audio data.

18 Claims, 22 Drawing Sheets

(56) References Cited

U.S. PATENT DOCUMENTS

| | | | |
|---|---|---|---|
| 2008/0170806 A1* | 7/2008 | Kim | G06T 7/0075 |
| | | | 382/285 |
| 2009/0041428 A1* | 2/2009 | Jacoby et al. | 386/104 |
| 2010/0313222 A1* | 12/2010 | Lee et al. | 725/50 |
| 2011/0221910 A1 | 9/2011 | Nonaka et al. | |
| 2012/0218275 A1* | 8/2012 | Wu | 345/501 |
| 2012/0331168 A1* | 12/2012 | Chen | 709/231 |
| 2015/0187098 A1* | 7/2015 | Ofstad et al. | 386/241 |

\* cited by examiner

APPARATUS, METHOD, AND COMPUTER-READABLE RECORDING MEDIUM FOR CREATING AND REPRODUCING LIVE PICTURE FILE

CROSS-REFERENCE TO RELATED APPLICATION(S)

This application claims the benefit under 35 U.S.C. §119 (a) of a Korean patent application filed on Mar. 21, 2013 in the Korean Intellectual Property Office and assigned Serial number 10-2013-0030481, the entire disclosure of which is hereby incorporated by reference.

TECHNICAL FIELD

The present disclosure relates to an apparatus and a method for creating and reproducing an image file. More particularly the present disclosure relates to an apparatus, a method, and a computer-readable recording medium capable of simultaneously outputting related audio data in reproducing an image file.

BACKGROUND

A picture may be characterized by an image, and/or image data, and music or recorded voice may be characterized as audio data. Further, a dynamic image may refer to video data made by a combination of an image and audio data.

Since multimedia, such as the image, the audio data, and the dynamic image, has different characteristics according to a respective media type, applications, for example, an image viewer, a video player and the like, suitable for performing operations on and/or with corresponding media independently exist.

Information delivery and transmission based on a text has been common in the related art, but a more valuable service is currently provided through a combination of various multimedia data, such as an image, a video, and audio data.

Meanwhile, image data, including a picture, which is most widely used, has an advantage in that the image data has a small size in comparison with a dynamic image and can express high definition data. However, a picture is a still image, and thus, has a disadvantage in that the picture is not enough to deliver lively atmosphere of the scene.

Accordingly, a method which may generate lively multimedia data from image data having a small size and which may provide various additional services through the multimedia data is needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus, a method, and a computer-readable recoding medium for creating and reproducing a live picture file, which may provide a lively atmosphere of the scene with higher definition and lower size in comparison with a dynamic image by combining image data and audio data to create a live picture file.

Another aspect of the present disclosure is to provide an apparatus, a method, and a computer-readable recoding medium for creating and reproducing a live picture file, which may provide various additional services related to image data by combining the image data and audio data in order to create a live picture file and further including additional metadata in addition to the live picture file.

In accordance with an aspect of the present disclosure, an apparatus for creating a live picture file is provided. The apparatus includes an audio editor configured to edit audio data having a predetermined time length in order to create edited audio data, and an encoder configured to encode image data and the audio data edited by the audio editor in order to create a live picture file, wherein the live picture file includes at least one of an image data area including the image data, an additional data header area including information related to additional data including the audio data, and an audio data area including the edited audio data.

In accordance with another aspect of the present disclosure, an apparatus for reproducing a live picture file is provided. The apparatus includes a decoder configured to decode a live picture file, the live picture file including at least one of an image data area including image data, an additional data header area including information related to additional data including audio data, and an audio data area including the audio data, in order to extract the image data and the audio data, and a live picture reproduction processor configured to simultaneously display image data decoded by the decoder on a screen and outputs audio data decoded by the decoder.

In accordance with another aspect of the present disclosure, a method of creating a live picture file is provided. The method includes editing audio data having a predetermined time length in order to create edited audio data, and encoding image data and the edited audio data in order to create a live picture file, wherein the live picture file includes at least one of an image data area including the image data, an additional data header area including information related to additional data including the audio data, and an audio data area including the edited audio data.

In accordance with another aspect of the present disclosure, a method of reproducing a live picture file is provided. The method includes decoding a live picture file, the live picture file including at least one of an image data area including image data, an additional data header area including information related to additional data including audio data, and an audio data area including the audio data, in order to extract the image data and the audio data, and simultaneously displaying decoded image data on a screen and outputting decoded audio data In accordance with another aspect of the present disclosure, information for performing a process of creating and reproducing a live picture file may be stored in a server computer-readable recording medium. The recording medium may be any type of recording media that stores programs and data readable by a computer system. Examples of the recording media include a Read Only Memory (ROM), a Random Access Memory (RAM), a Compact Disk (CD), a Digital Video Disk (DVD)-ROM, a magnetic tape, a floppy disk, an optical data storage device and the like, and also include implementations in the form of carrier wave, for example, transmission through the Internet. Further, the recording media may store and execute codes distributed to a computer system connected through a network and readable by a computer in a distributed manner.

As described above, according to an embodiment of the present disclosure, audio data and metadata are encoded into a general picture and generated as a live picture file, so that the general picture may be reconfigured as a picture having realism.

According to an embodiment of the present disclosure, a live picture file is created by combining recorded voice data of a user with a general picture image, thereby adding a voice memo to the picture.

When the present disclosure is applied to educational contents, an educational effect may be increased through a file having a smaller size in comparison with a dynamic image by inserting a voice explanation corresponding to a paused lecture material as well as an educational memo and writing contents.

Further, when the present disclosure is applied to a music album image, for example, a jacket image, a pre-listening function by the music album image may be provided.

In addition, when the present disclosure is applied to producing an advertisement, such as company or broadcast promotion contents, advertisement audio data may be provided while an advertisement image is reproduced and a related homepage may be directly accessed through the advertisement image, thereby maximizing a promotion effect.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
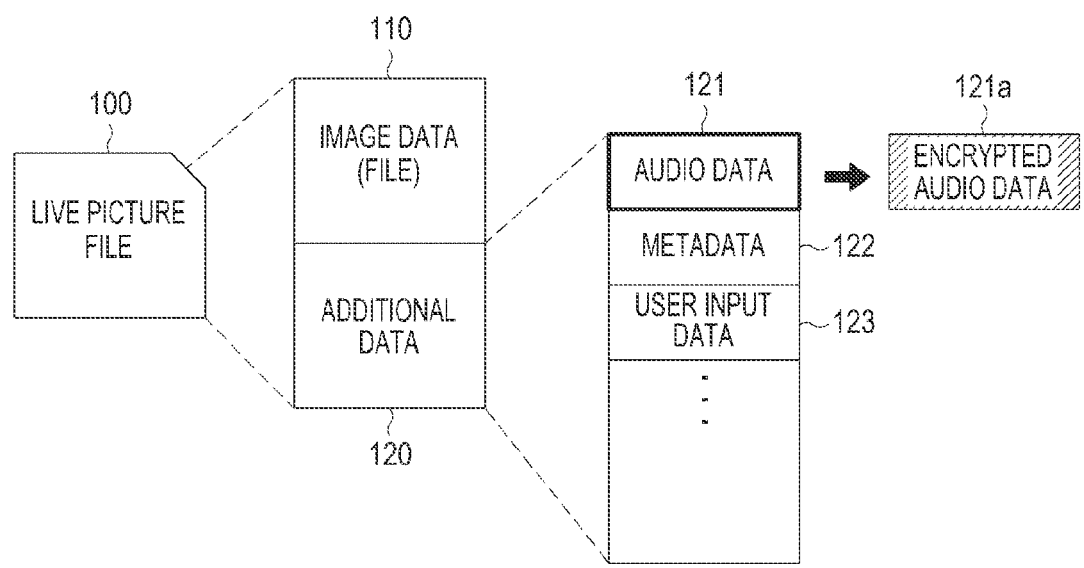
FIG. 1 is a block diagram schematically illustrating a structure of a live picture file according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure relates to an apparatus and a method for combining image data and audio data to create a file and for simultaneously displaying the image data and outputting the audio data when the created file is reproduced.

The file created by combining the image data and the audio data, according to an embodiment of the present disclosure, is hereinafter named a "live picture file" for the sake of convenience. The live picture file is not limited to a particular standard or a particular type of file and may refer to any file standard and/or type that includes a combination of image data and audio data. Accordingly, any type of file which can be created by combining image data and audio data may be the live picture file according to the present disclosure based on various methods according to an embodiment of the present disclosure described below. Further, in the following description, "image data" may refer to still image data, which may be distinguished from dynamic image data, but the live picture file, according to an embodiment of the present disclosure, is not limited to including only one still image and may include a plurality of still images.

Meanwhile, according to an embodiment of the present disclosure, the live picture file may further include various additional data as well as audio data. For example, the live picture file may further include various metadata related to the image data included in the live picture file, various metadata related to the audio data, and various information, for example, writing data, additionally input by the user, and any other similar and/or suitable data that may be included with image data and/or audio data.

Accordingly, when the live picture file is reproduced, the audio data may be output and the image data may be displayed at the same time, and the various additional data included in the corresponding picture file may be further provided.

For example, when hypertext information is further included in the live picture file as the additional data according to an embodiment of the present disclosure, if a particular area of an image displayed when the live picture file is reproduced and/or a particular icon is selected, a webpage corresponding to the hypertext included as the additional information may be provided.

Further, in another example, when position information, for example, information on a position where the image data is created or photographed, is further included in the live picture file as the additional data according to an embodiment of the present disclosure, if a particular area of displayed image data or a particular icon is selected, an application related to an electronic map may be executed and a geographical position corresponding to the position information may be displayed on the electronic map.

Hereinafter various embodiments of the present disclosure will be described in detail with reference to the accompanying drawings so that the present disclosure can be easily implemented by those skilled in the art.

A structure of the live picture file created according to an embodiment of the present disclosure will be first described with reference to FIGS. 1 to 3, and then an apparatus and a method according to an embodiment of the present disclosure will be described in detail with reference to FIGS. 4 to 12.

Live Picture File Structure

FIG. 1 is a block diagram schematically illustrating a structure of the live picture file according to an embodiment of the present disclosure.

Referring to FIG. 1, a live picture file 100, according to an embodiment of the present disclosure, may include image data 110 and additional data 120. The live picture file 100 may be configured by combining the additional data 120 with an image file existing in the form of a file.

The additional data 120 may include audio data 121, according to an embodiment of the present disclosure, and may further include metadata 122 and user input data 123. That is, the additional data 120 corresponds to data additionally provided when the image data 110 is displayed on a screen according to an embodiment of the present disclosure, and any type and form of data may be included in the additional data 120 of the present disclosure.

That is, when the audio data 121 is included in the additional data 120, the image data 110 is reproduced to display a corresponding image and the audio data 121 is reproduced to output the audio data, for example, data corresponding to a voice or a sound, through a speaker or an earphone at the same time as when the live picture file is reproduced.

Further, when the hypertext information is included in the additional data 120 as the metadata 122, a function of simultaneously reproducing the image data 110 to display a corresponding image and accessing a webpage corresponding to the hypertext information may be provided when the live picture file is reproduced. For example, a web browser may be executed by selecting a particular icon and/or a menu displayed on the image and a webpage corresponding to the hypertext may be displayed.

Further, when the position information is included in the additional data 120 as the metadata 122, a function of simultaneously reproducing the image data 110 to display a corresponding image and displaying a position corresponding to the position information on an electronic map may be provided when the live picture file is reproduced. For example, a position related to the displayed image may be identified by executing an electronic map application through a selection of a particular icon or a menu displayed on the image and by displaying a position corresponding to the position information on the electronic map.

Further, when the user input data 123 is included in the additional data 120, a function of simultaneously reproducing the image data 110 to display a corresponding image and displaying the user input data 123 may be provided when the live picture file is reproduced. For example, the user input data 123 may be displayed on a particular area of the image or the user input data 123 may be identified by selecting a particular icon or menu displayed on the image.

Meanwhile, the audio data 121 corresponding to the additional data 120 may be encrypted and then may be stored according to an embodiment of the present disclosure. Accordingly, the audio data 121, in the form of file, may be directly included, and/or encrypted audio data 121a, may be included in an area of the additional data 120.

Referring to FIG. 1, arrangement positions, locations, and/or orders of the data and elements illustrated in FIG. 1 may be changed and the present disclosure is not limited to particular positions or arrangements of the data.

Figure 2:
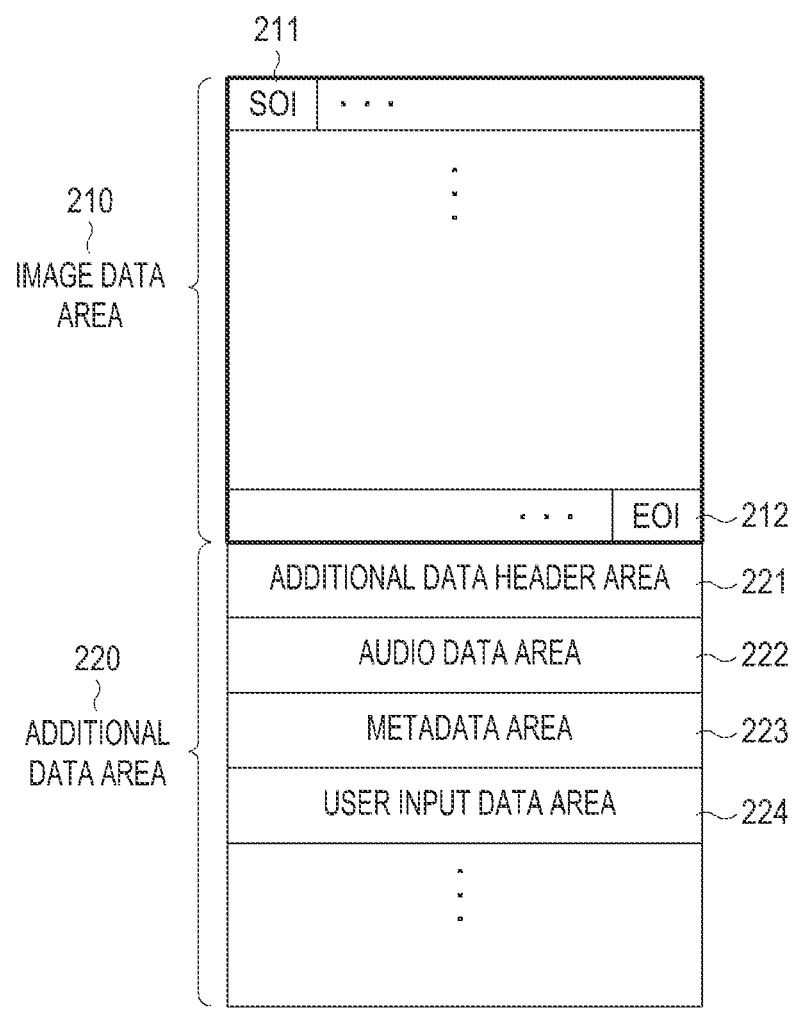
FIG. 2 illustrates a detailed structure of a live picture file according to an embodiment of the present disclosure.

FIG. 2 illustrates a detailed structure of the live picture file according to an embodiment of the present disclosure.

Referring to FIG. 2, the live picture file 100 may include an image data area 210, where image data or an image file is arranged, and an additional data area 220, where various additional data are arranged according to an embodiment of the present disclosure.

Meanwhile, data within the image data area 210 and data within the additional data area 220 may be combined and/or encoded by an encoding method. However, when the image data area 210 and the additional data area 220 are encoded while being separated from each other, as illustrated in FIG. 2, an image stored in the image data area 210 may be displayed even in a general image viewer application which does not support a function of reproducing the live picture file. All or some of the data included in the additional data area 220 may be disregarded in the general image viewer application.

The image data included in the image data area 210 may be configured in various image data formats. For example, any type of image data format, such as Graphics Interchanging Format (GIF), Joint Photographic Experts Group (JPEG), Windows Bitmap (BMP), Portable Network Graphics (PNG), Portable Document Format (PDF), Encapsulated PostScript (EPS), ZSoft Paint format (PCX), Tagged Image File Format (TIFF), Truevision File Format (TGA), PICtor (PIC), Microsoft Windows Metafile (WMF), X PixMap (XPM), Adobe Photoshop (PS), and any other similar and/or suitable image data format may be included in the image data area 210.

Meanwhile, the image data area 210 may include a Start Of Image (SOI) field 211 indicating a start of the image data at a data start portion and may include an End Of Image (EOI) field 212 indicating an end of the image data at a data end portion. Accordingly, in an application for reproducing the live picture file according to an embodiment of the present disclosure, the corresponding image may be displayed on the screen by identifying the SOI field 211 and the EOI field 212 included in the image data area 210. Further, even in a general image viewer application which has no function of reproducing the live picture file, the corresponding image may be displayed on the screen by identifying the SOI field 211 and the EOI field 212 included in the image data area 210.

The additional data area 220 may include an additional data header area 221, an audio data area 222, a metadata area 223, and a user input data area 224 according to an embodiment of the present disclosure, and orders and/or arrangements of the areas and/or elements shown in FIG. 2 are not limited to the orders and/or arrangements shown in FIG. 2 and may be changed. Additionally, any one of the areas shown in FIG. 2 may be omitted.

The additional data header area 221 may include header information, for example, information on a type of additional data, an existence of additional data, and a length of additional data, related to various additional data included in the additional data area 220. The audio data area 222 includes audio data as one example of the additional data. The metadata area 223 includes various metadata, for example, hyperlink information, image-related position information, time information, camera information, sound-related various information and the like, as one example of the additional data. The user input data area 224 includes information, for example, image-related memo information and the like, directly input by the user as one example of the additional information.

Various types of additional information which have not been mentioned above may be further included in the additional data area 220, and the various types of additional data and the image may be simultaneously displayed according to an execution of the live picture file.

Figure 3:
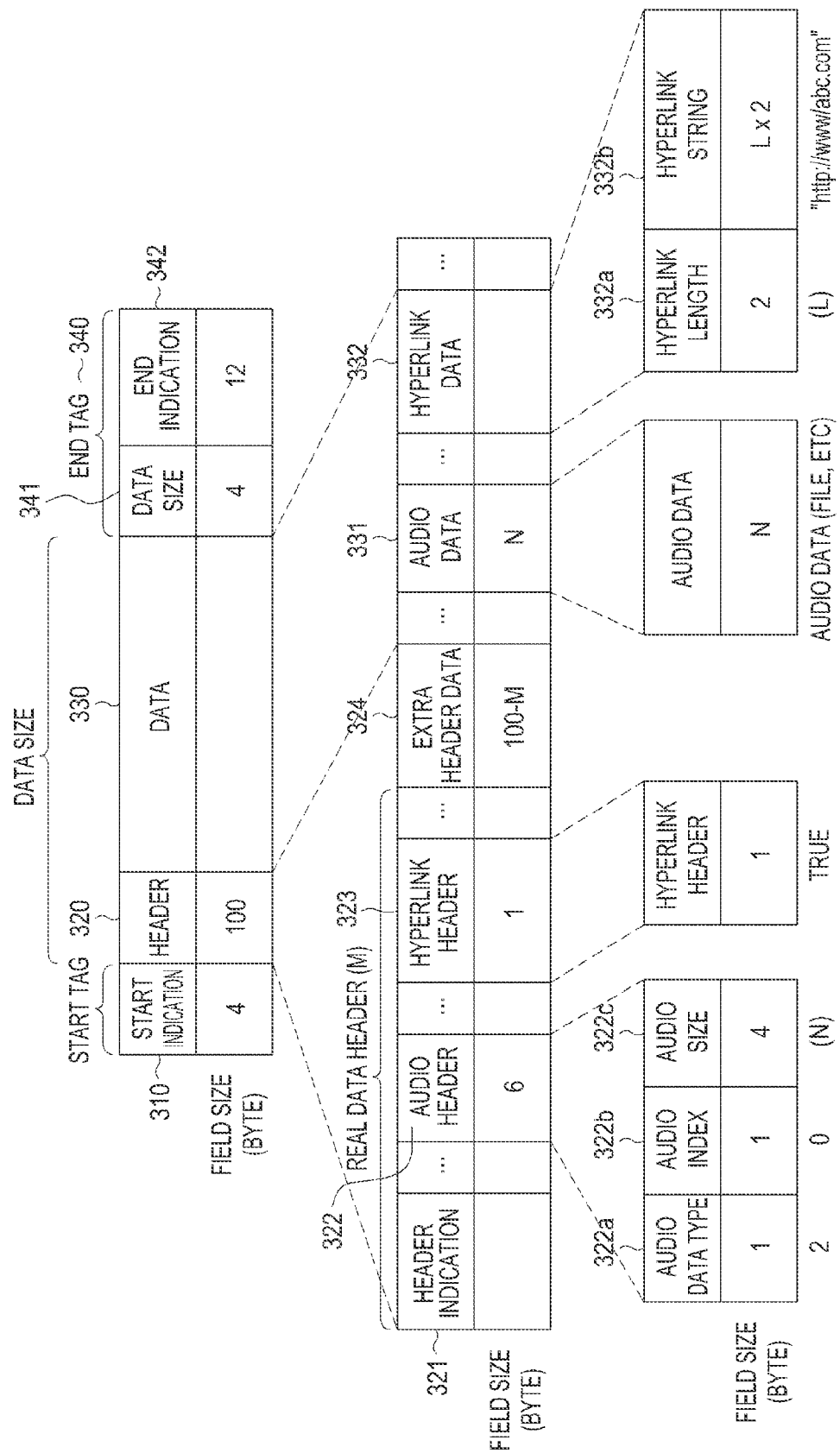
FIG. 3 illustrates a detailed configuration of data fields of an additional data area according to an embodiment of the present disclosure.

FIG. 3 illustrates a detailed configuration of data fields of the additional data area 220 according to an embodiment of the present disclosure.

Referring to FIG. 3, the additional data area 220 may include a start indication field 310 as a start tag area, a header area 320, a data area 330, and a data size field 341 and an end indication field 342 as an end tag area 340.

The start indication field 310 and the end indication field 342 are data fields respectively indicating a start and an end of the additional data area 220.

The header area 320 corresponds to a header part of the additional data area and may include a header indication field 321, an audio header field 322, a hyperlink header field 323, and an extra header data field 324. The header area 320 indicates the existence of the additional data and basic data information of the additional data, and may be configured to have a fixed length, for example, 100 bytes, or may be variably configured.

The header indication field 321 is a data field indicating that the following data is header data. The audio header field 322 may include information related to the audio data, such as an audio data type 322a, an audio index 322b, and an audio size 322c of the audio data included in a audio data field 331. The hyperlink header field 323 may include information indicating the existence of the hyperlink and information related to hyperlink data included in a hyperlink data field 332.

Meanwhile, next to the header area 320, various additional data to be used are included in the data area 330. For example, the data area 330 may include the audio data field 331 and the hyperlink data field 332 and thus include various types of actual additional data.

For example, the audio data field 331 includes actual audio information and/or an audio file in the form of binary data. Further, the hyperlink data field 332 may include a hyperlink length field 332a, including information indicating a length of a hyperlink string, and a hyperlink string field 332b, including actual hyperlink string data.

Meanwhile, although FIG. 3 illustrates the audio data and the hyperlink data as examples of the additional data, various metadata, such as GPS position information, may be further included and the present disclosure is not limited to the types of additional information described herein.

Live Picture File Creating Apparatus

Figure 4:
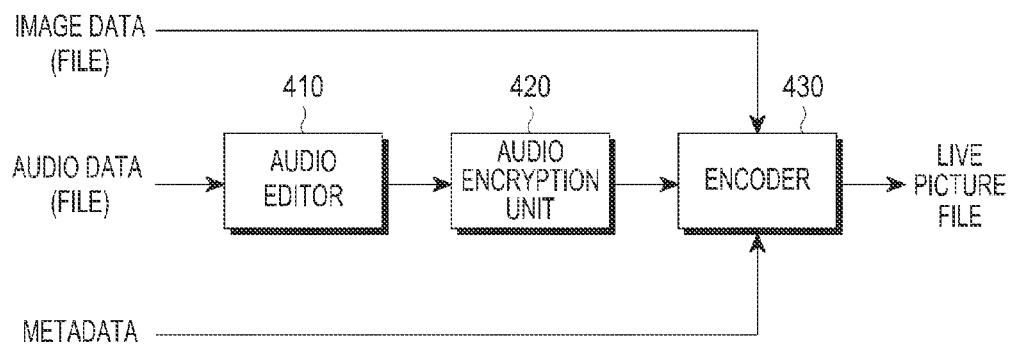
FIG. 4 is a block diagram illustrating a live picture file creating apparatus according to an embodiment of the present disclosure.

FIG. 4 is a block diagram illustrating a live picture file creating apparatus according to an embodiment of the present disclosure.

Referring to FIG. 4, the live picture file creating apparatus may include an audio editor 410, an audio encryption unit 420, and an encoder 430.

The audio editor 410 performs a function of editing audio data recorded when a picture is taken through the camera and/or editing audio data and/or an audio file stored in the storage medium in order to convert the edited audio data into audio data that is to be included in the live picture file. For example, the entirety of the audio data recorded when the picture is taken through the camera and/or the audio data and/or the audio file pre-stored in the storage medium may be directly used without any separate editing or may be used after some of the audio data is edited.

More specifically, by analyzing the audio data and/or the audio file, an audio file in which only a predetermined section of the audio data, including important sound data, is edited may be used. That is, section data including a particular frequency signal, for example, a frequency signal corresponding to a human's voice, a frequency signal corresponding to a music sound or the like, may be cut from the whole audio data and then used as the audio data to be included in the live picture file. Further, a predetermined time section may be set in advance, and only data of the corresponding time section may be cut and then used. In addition, the audio data may be processed to remove noise and a start or end point of the audio data may be processed to be faded-in and faded-out, respectively.

The audio encryption unit 420 performs a function of encrypting the audio data edited by the audio editor 410. A method of encrypting the audio data may include various encryption methods, but the present disclosure is not limited to a particular encryption method. Further, the audio encryption unit 420 may be selectively included in the apparatus according to an embodiment of the present disclosure. Accordingly, the audio data edited by the audio editor 410 may be encoded directly by the encoder 430 without any encryption processing procedure.

The encoder 430 creates the live picture file according to an embodiment of the present disclosure by encoding image data and/or an image file, the audio data encrypted by the audio encryption unit 420, metadata, user input data and the like. An encoding method of the encoder 430 may include various methods, and the live picture file created through the encoding by the encoder 430 may be configured, for example, in the form as illustrated in FIGS. 1 to 3.

Meanwhile, the creation of the live picture file by the live picture file creating apparatus may be performed by using image data photographed when the picture is taken through the camera and audio data recorded when the picture is taken and/or by using image data already stored in the storage medium and audio data selected from the stored audio data and/or audio data created through audio recording.

Further, the audio data and/or the audio file provided to the audio editor 410 may be created in various ways. For example, the live picture file may be created by taking the picture using the camera and by performing audio recording at the same time and then encoding the taken picture and the recoded audio data through the above described method.

More specifically, when a camera mode starts to take a picture and/or a recording function is activated by a user's input in the camera mode, the audio recording may start. Further, when a picture is taken according to a user's input, such as clicking a photographing button or after a preset time elapses from the photographing, the audio recording may automatically end. Alternatively, the audio data for creating the live picture file may be created by directly ending the recording by the user.

Live Picture File Reproducing Apparatus

Figure 5:
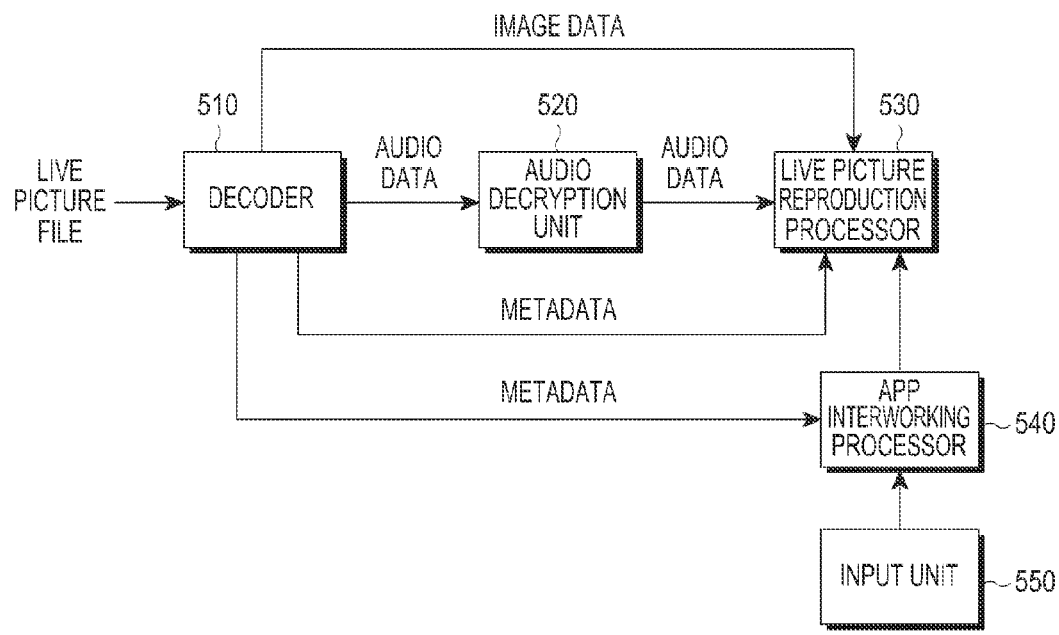
FIG. 5 is a block diagram illustrating a live picture file reproducing apparatus according to an embodiment of the present disclosure.

FIG. 5 is a block diagram illustrating a live picture file reproducing apparatus according to an embodiment of the present disclosure. Referring to FIG. 5, the live picture file reproducing apparatus according to an embodiment of the present disclosure may include a decoder 510, an audio decryption unit 520, a live picture reproduction processor 530, an application (app) interworking processor 540, and an input unit 550.

The decoder 510 performs a function of decoding the live picture file created in the form as illustrated in FIGS. 1 to 3 in order to separate the live picture file into image data, audio data and/or encrypted audio data, and metadata. It is preferable that a decoding method by the decoder 510 corresponds to the encoding method by the encoder 430 of the live picture file creating apparatus.

The audio decryption unit 520 performs a function of decrypting the encrypted audio data, which has been decoded by the decoder 510 and extracted. A decryption method used by the audio decryption unit 520 should correspond to and/or is compatible with the encryption method used by the audio encryption unit 420 of the live picture file creating apparatus. Meanwhile, when the audio encryption unit 420 is omitted from the live picture file creating apparatus, the audio decryption unit 520 of the live picture file reproducing apparatus may be omitted.

The live picture reproduction processor 520 performs a function of reproducing various data, which is decoded by the decoder 510, as a live picture. That is, the image data created through the decoder 510 is processed to be displayed on the screen through an image display means. Further, the audio data created through the decoder 510 is processed to be output through an audio output means, for example, a speaker, an earphone or the like. The audio data may be processed to be output simultaneously with a start of the displaying of the image data and/or may be implemented to start and/or end when the audio data is output by selecting a particular image and/or icon, by the user, after the image data is displayed.

Further, various metadata decoded by the decoder 510 may perform a corresponding function according to a characteristic of each data from among the various metadata.

That is, when the metadata is hypertext data, the app interworking processor 540 executes a web browser according to an execution of the metadata and makes, and/or transmits, a request for a webpage to an address corresponding to the hypertext data in order to allow browsing of the webpage.

Meanwhile, when the metadata is Global Positioning System (GPS) position information, if the user makes a request for displaying position information on the input unit 550, an electronic map application is executed and then the position information corresponding to the metadata is displayed on the electronic map.

As described above, the various metadata decoded by the decoder 510 provide various additional functions simultaneously with the displaying of the image data according to a characteristic of the data and/or through an interworking with a corresponding related application at an execution time of executing the application by the user through the input unit 550.

Meanwhile, components of the apparatus, as illustrated in FIG. 5, are separately illustrated in the drawings to indicate that they can be functionally and logically separated from each other, but the components do not have to be separate components or implemented as separate codes.

Further, in this specification, each function unit, element, or module may refer to a functional and/or structural combination of hardware for realizing the technical idea of the present disclosure and software for driving the hardware. For example, each function unit may refer to a logical unit of a predetermined code or a hardware resource for executing the predetermine code, and it may be understood by those skilled in the art that the function unit does not necessarily refer to a physically connected code or one type of hardware.

Hereinafter, processes for creating, editing, and reproducing the live picture file will be described with reference to FIGS. 6 to 12.

Live Picture File Creating Method

Figure 6:
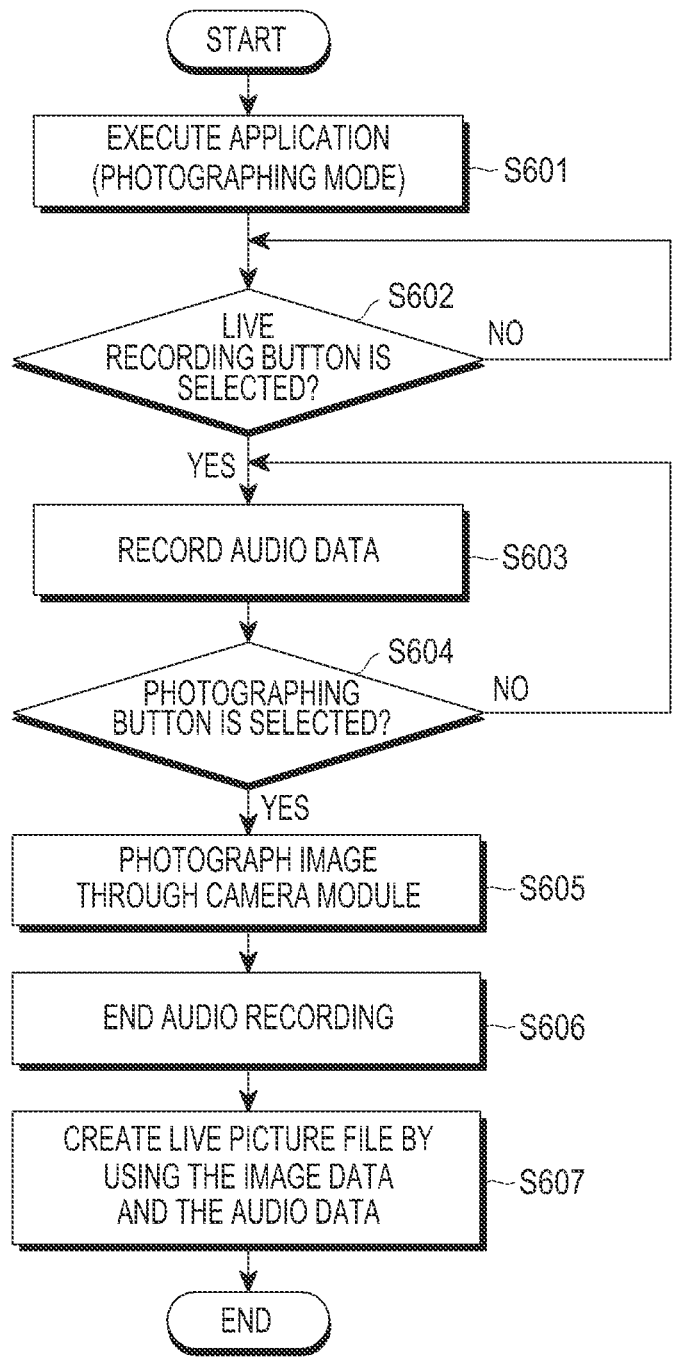
FIG. 6 is a flowchart illustrating a live picture file creating process according to an embodiment of the present disclosure.

FIG. 6 is a flowchart illustrating a live picture file creating process according to an embodiment of the present disclosure.

Referring to FIG. 6, an application is executed, the application supporting a live picture file creating function, in operation S601. Meanwhile, as the application is executed, a photographing mode, in which a picture can be taken through the camera, may be switched to. At this time, it is determined whether a live recording button, included in the application, is selected by a user in operation S602. When the live recording button is selected in operation S602, audio data input through a microphone may be recorded in operation S603.

It is determined whether the user selects the photographing button while the audio data is recorded in operation S604. When the user selects the photographing button in operation S604, a picture is taken by the camera module in operation S605 and photographed image data is stored in the storage medium. The audio recording may end simultaneously with the selection of a live recording end button or the photographing of the picture by the user in operation S606.

Accordingly, when the image data and the audio data are created in operations S601 to S607, the live picture file may be created by using, or in other words, encoding, the image data and the audio data in operation S607. According to an embodiment of the present disclosure, the operation S607 may be executed such that the live picture file is automatically created after operations S601 to S607.

Figure 7:
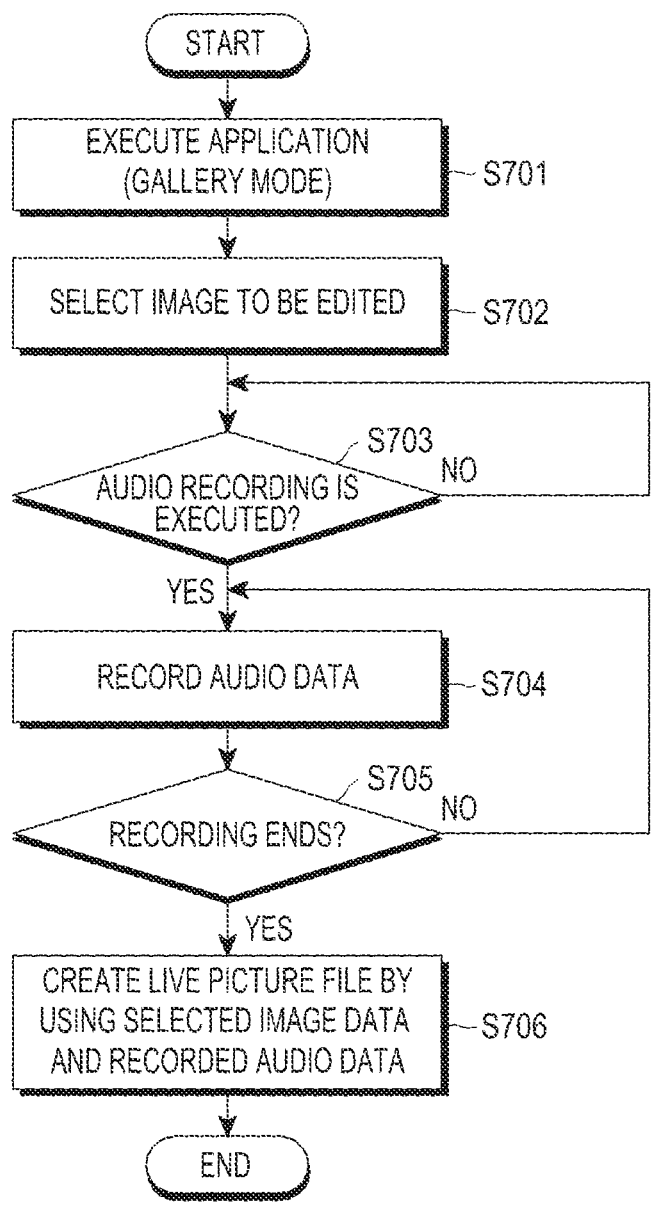
FIGS. 7, 8, and 9 are flowcharts illustrating a live picture file editing processes according to an embodiment of the present disclosure.
Figure 8:
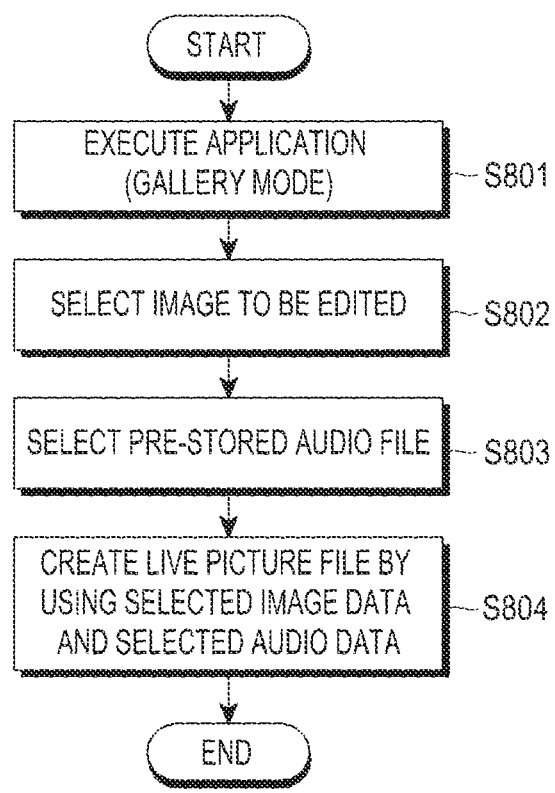
Figure 9:
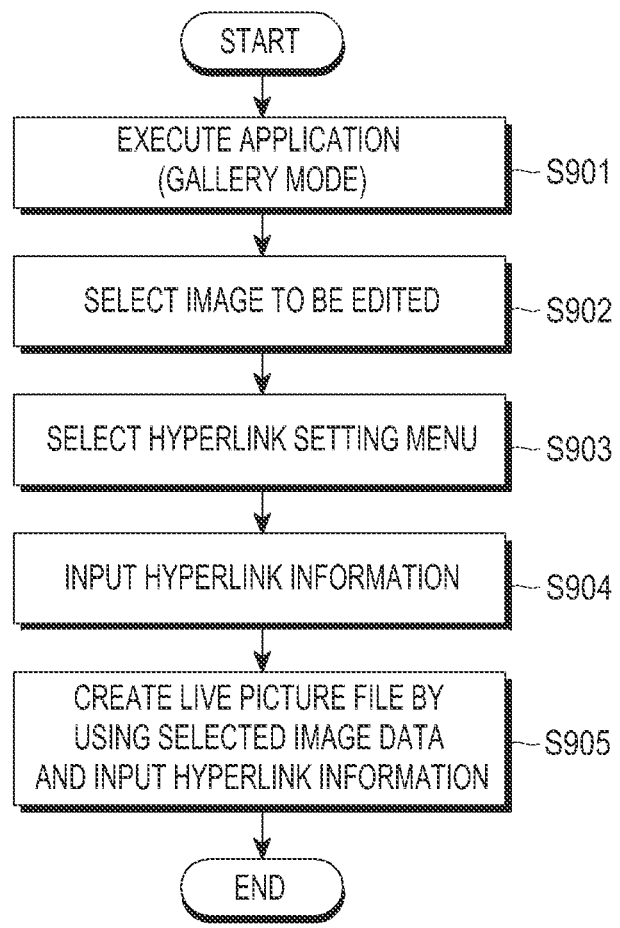

FIGS. 7 to 9 are flowcharts illustrating a live picture file editing process according to an embodiment of the present disclosure.

Referring to FIG. 7, an application is executed, the application supporting a live picture file creating or editing function, in operation S701. Meanwhile, as the application is executed, a gallery mode, in which an image file pre-stored in the storage medium can be identified, may be switched to.

At this time, a particular image to be included in the live picture file is selected, or in other words, an image to be edited is selected in operation S702. It is determined whether an audio recording, is executed in operation S703, and when the audio recording is executed in operation S703, audio data, such as an audio signal input through a microphone, is recorded in operation S704.

It is determined if the user ends the recording of the input audio signal in operation S705. When the user ends the recording in operation S705, the audio data is created, and the live picture file is created by using, i.e., encoding, the selected image data and the recorded audio data according to the above described method in operation S706. According to an embodiment of the present disclosure, the operation S706 may be executed such that the live picture file is automatically created after operations S701 to S605.

Referring to FIG. 8, in another live picture file creating method, the live picture file may be created by selecting the image data and the audio data already stored in the storage medium. That is, an application is executed, the application supporting a live picture file creating or editing function, in operation S801. Meanwhile, as the application is executed, a gallery mode, in which an image file pre-stored in the storage medium can be identified, may be switched to.

At this time, an image to be edited, so as to be included in the live picture file, is selected in operation S802 and a pre-stored audio file is selected in operation S803. Thereafter, when the creation of the live picture file is executed, the live picture file may be created by using the selected image data and the selected audio data according to the above described method in operation S804. According to an embodiment of the present disclosure, the operation S804 may be executed such that the live picture file is automatically created after operations S801 to S803.

Referring to FIG. 9, by adding various additional data, for example, hyperlink data, to the live picture file, various additional functions may be provided when the live picture file is reproduced. That is, an application is executed, the application supporting a live picture file creating or editing function, in operation S901. Meanwhile, as the application is executed, a gallery mode, in which an image file or live picture file pre-stored in the storage medium can be identified, may be switched to.

At this time, an image to be edited is selected in operation S902 and a hyperlink setting menu is selected in operation S903. Thereafter, hyperlink information, to be included in the live picture file, is input in operation S904. The live picture file is created by using the selected image data and the input hyperlink information in operation S905, or in other words, the life picture file, including additional data of the hyperlink, may be created by encoding the selected image file, or the live picture file, and the input hyperlink information according to the above described method in operation S905.

Live Picture File Reproducing Method

Figure 10:
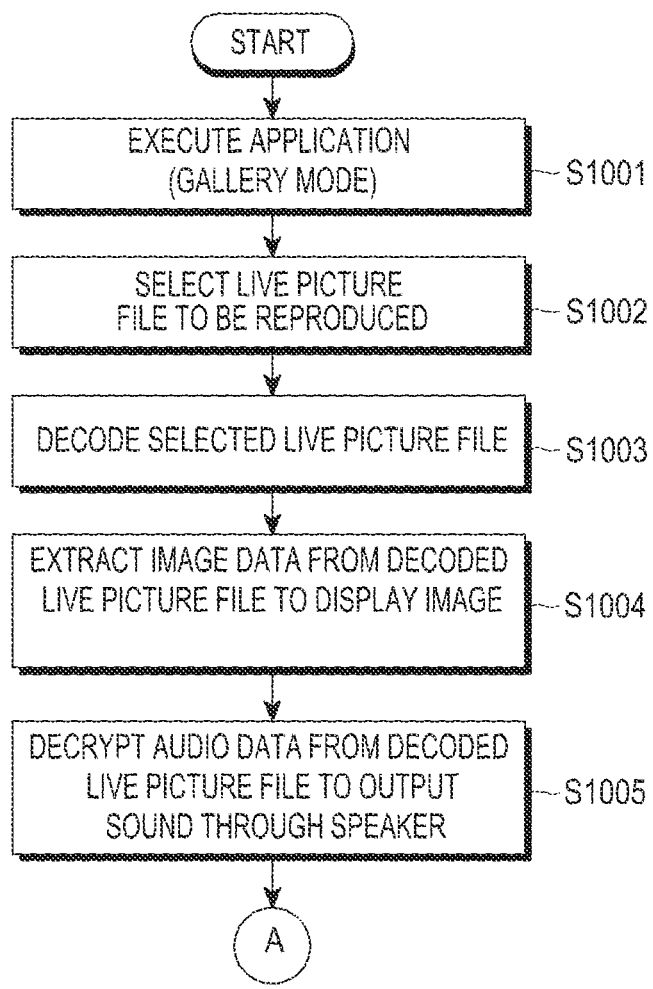
FIGS. 10, 11, and 12 are flowcharts illustrating a live picture file reproducing processes according to an embodiment of the present disclosure.
Figure 11:
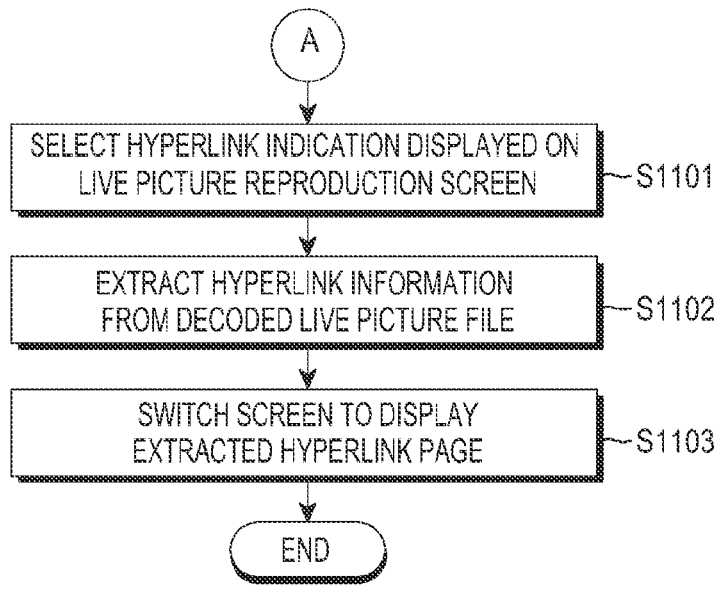
Figure 12:
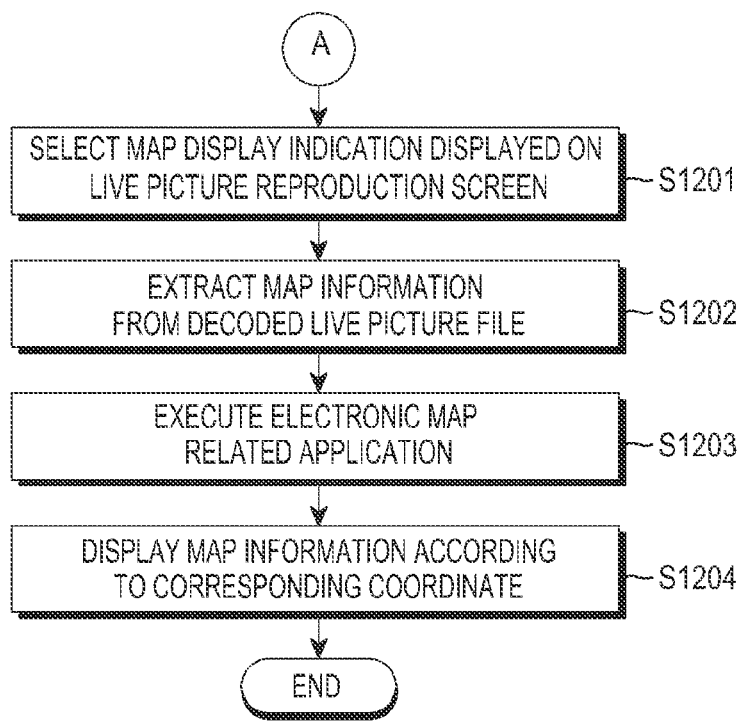

FIGS. 10 to 12 are flowcharts illustrating a live picture file reproducing process according to an embodiment of the present disclosure.

Referring to FIGS. 10 to 12, image data may be displayed and audio data may be output or various additional data may be provided at a same time by reproducing the live picture file created according to the above described method.

Referring to FIG. 10, an application is executed, the application supporting a live picture file reproducing function, in operation S1001. Meanwhile, as the application is executed, a gallery mode, in which a live picture file pre-stored in the storage medium can be identified, may be switched to. At this time, the live picture file may be displayed in the form of an image as illustrated in FIGS. 15 to 19. Each image has an indication indicating that a corresponding file is the live picture file and/or the live picture, including additional data, so that the user may easily recognize that the corresponding file is the live picture file and that the file provides additional functions.

The user selects a live picture file to be reproduced in operation S1002. The selected live picture file is decoded according to the above described method in operation S1003. Image data is extracted from the decoded live picture file in order to display an image on the screen in operation S1004. Audio data, which may be encrypted audio data and which is extracted from the decoded live picture file, is decrypted in order to output sound through a speaker and/or an earphone in operation S1005.

Meanwhile, after the image data and the audio data are reproduced through the execution of the reproduction of the live picture file, various additional functions may be provided through additional data included in the live picture file according to the user's selection.

For example, referring to FIG. 11, a hyperlink indication, which may be a hyperlink button, displayed on the live picture reproduction screen reproduced according to FIG. 10, is selected in operation S1101. Hyperlink information is extracted from the decoded live picture file in operation S1102 and a screen to display a hyperlink page and/or webpage, corresponding to the extracted hyperlink information, is switched to in operation S1103, such that the webpage corresponding to the extracted hyperlink may be browsed in operation S1103, thereby providing the webpage related to the displayed image.

In another example, referring to FIG. 12, a map display indication, which may be a map display button, displayed on the live picture reproduction screen reproduced according to FIG. 10, is selected in operation S1201. Map information, which may include position information such as GPS information, is extracted from the decoded live picture file in operation S1202 and an application related to the electronic map is executed in operation S1203. The map information, such as the extracted position information on the executed electronic map, is displayed according to a corresponding coordinate in operation S1204. Additionally, position information, for example, position where the picture is taken, related to the displayed image may be provided.

Meanwhile, the live picture file creating and reproducing method according to an embodiment of the present disclosure may be implemented in the form of a program command which may be executed through various computer elements, units, and apparatuses and recorded in a computer-readable medium. The computer-readable medium may include a program command, a data file, and a data structure, individually or as a combination thereof. The program command recorded in the computer-readable medium is designed and configured for the present disclosure, but may be used after being made known to those skilled in computer software fields. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are configured to store and perform program instructions. Examples of the program instructions include a machine language code generated by a compiler and a high-level language code that a computer may execute by using an interpreter and the like. The hardware devices may be configured to operate as at least one software module to perform the operations of the present disclosure, and vice versa.

Embodiment

Figure 13:
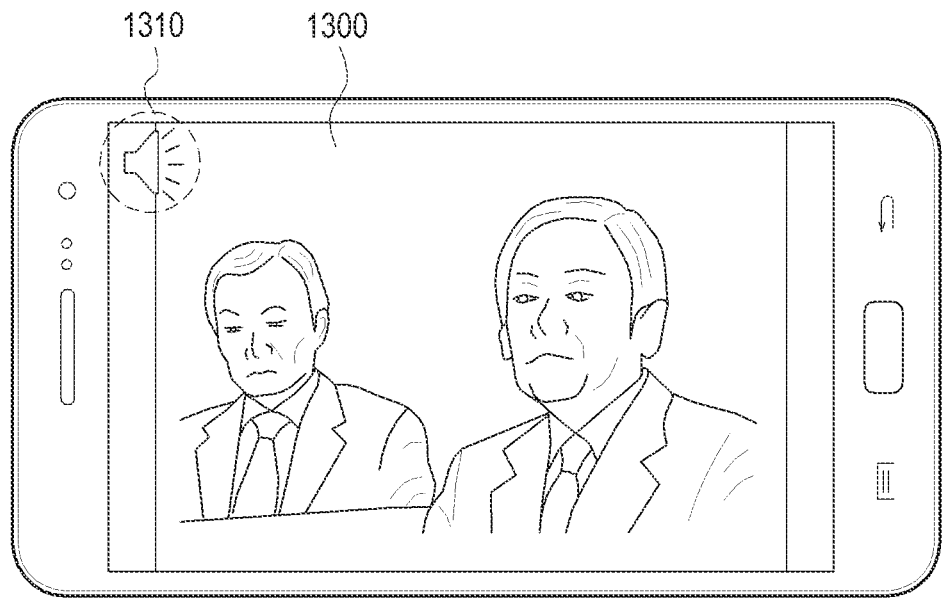
FIGS. 13 and 14 illustrate live picture file reproduction screens produced according to an embodiment of the present disclosure.
Figure 14:
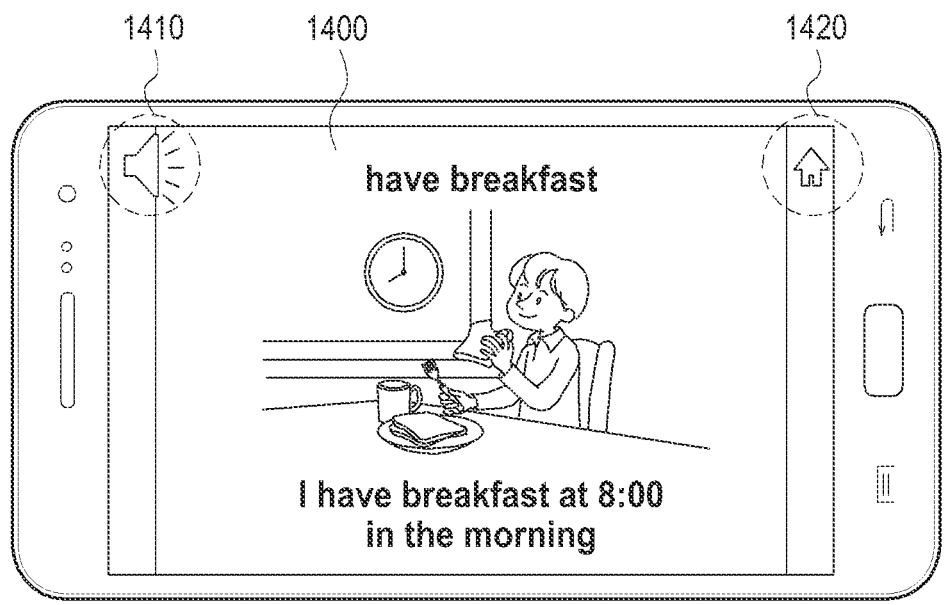

FIGS. 13 and 14 illustrate reproduction screens of the live picture file produced according to an embodiment of the present disclosure.

Referring to FIG. 13, when an application including a function of reproducing the live picture file produced according to an embodiment of the present disclosure is executed, a corresponding image 1300 is displayed on the screen by decoding image data included in the live picture file as illustrated in FIG. 13.

At this time, according to an embodiment of the present disclosure, audio data included in the live picture file is reproduced and thus a sound is output through a speaker and/or an earphone, or the sound is output by selecting a speaker image 1310 as illustrated in FIG. 13. Meanwhile, the reproduced live picture file may be a file created by taking a picture corresponding to recording audio data at the same time. Accordingly, an image having realism can be provided, instead of simple image information, through the outputting the audio data recorded when the corresponding picture is taken together with the displaying of the picture image.

Referring to FIG. 14, when an application including a function of reproducing the live picture file produced according to an embodiment of the present disclosure is executed, a corresponding image 1400 is displayed on the screen by decoding image data included in the live picture file as illustrated in FIG. 14.

At this time, according to an embodiment of the present disclosure, audio data included in the live picture file is automatically reproduced and thus a sound is output through a speaker and/or an earphone, or the sound is output by selecting a speaker image 1410 as illustrated in FIG. 14. Further, according to an embodiment of the present disclosure, when a hyperlink execution image 1420, which is displayed on the image, is selected, hyperlink data, which is included in the corresponding live picture file as the additional data, is decoded and extracted and a webpage corresponding to the extracted hyperlink data is requested and browsed on the screen.

Meanwhile, the reproduced live picture file may be a file created for education according to the processes of FIGS. 8 and 9 as illustrated in FIGS. 8 and 9. Accordingly, the picture image is displayed and education contents, for example, reading an English sentence, related to the corresponding picture are output as audio data at the same time, thereby providing a high learning effect through the link between the image data and the audio data. Further, the learning effect may be further improved by providing the hyperlink to allow a direct access to the webpage from which information related to the education contents can be additionally acquired.

Application Execution Screen

FIGS. 15 to 21 illustrate application execution screens for creating the live picture file produced according to an embodiment of the present disclosure.

Figure 15:
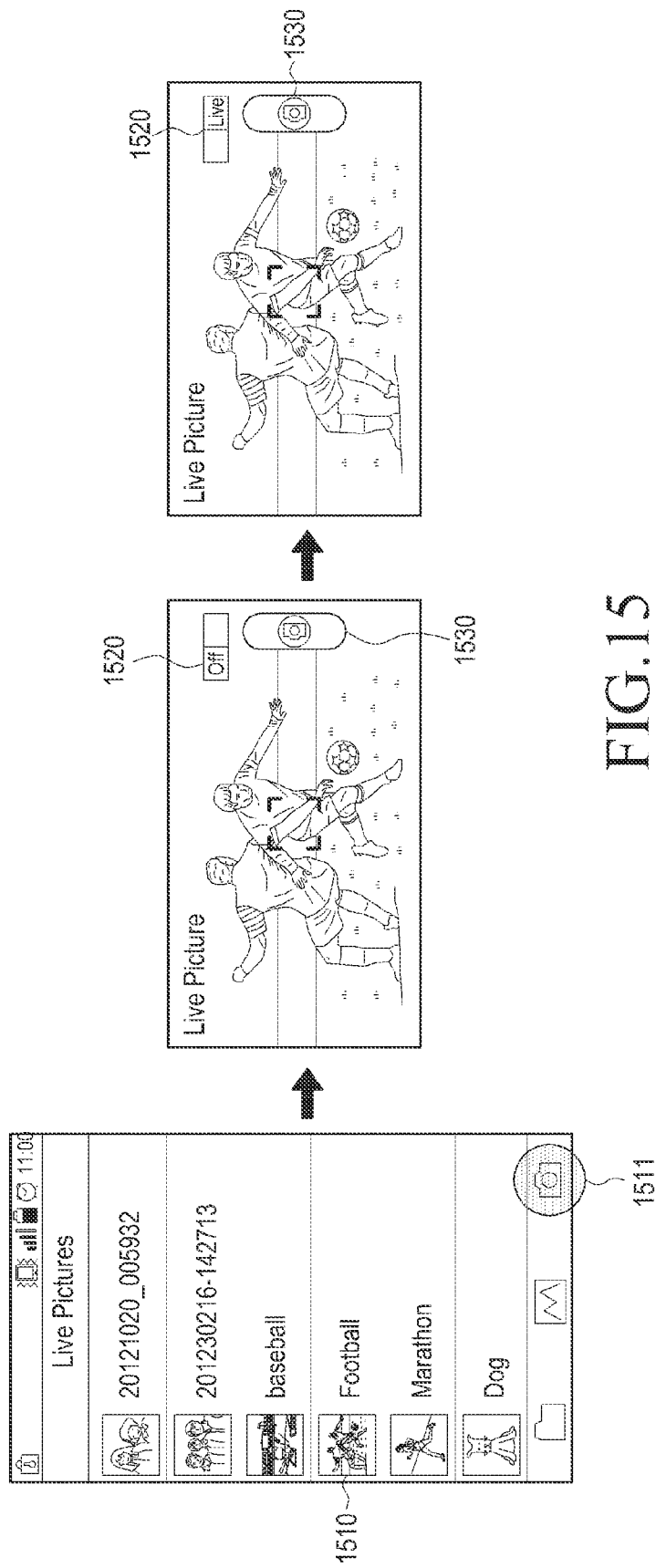
FIGS. 15, 16, 17, 18, 19, 20, and 21 illustrate application execution screens for creating a live picture file produced according to an embodiment of the present disclosure.

Referring to FIG. 15, when an application providing a live picture file creating function is executed, images of the already stored live picture files may be provided in the form of a thumbnail 1510 as illustrated in FIG. 15.

At this time, when a camera image 1511 is selected on the application execution screen, switching to a photographing mode is made by controlling the camera module. Meanwhile, in the photographing mode of the application, an audio recording button (not shown) may be additionally displayed separately from a photographing button 1530, unlike a general camera photographing screen. Accordingly, when the audio recording button is selected in the photographing mode and/or an audio switching button 1520 is changed from an "off" state to a "live" state, recording of the audio data input through a microphone starts.

Accordingly, when the user selects the photographing button 1530, an image displayed on the screen is photographed and stored as image data, and the live picture file is created by encoding the photographed image data and the recorded audio data according to an embodiment of the present disclosure.

Meanwhile, a start time and an end time of the audio recording may be variously realized according to an implementation method. For example, the recording may start when the switching to the camera photographing mode is made or when the audio recording button is selected. Further, the recording may end by selecting again the audio recording button or when the photographing by the camera is performed. In addition, as another embodiment, the recording automatically ends when a preset time elapses after the audio recording starts or when a preset time elapses after a picture is taken.

Figure 16:
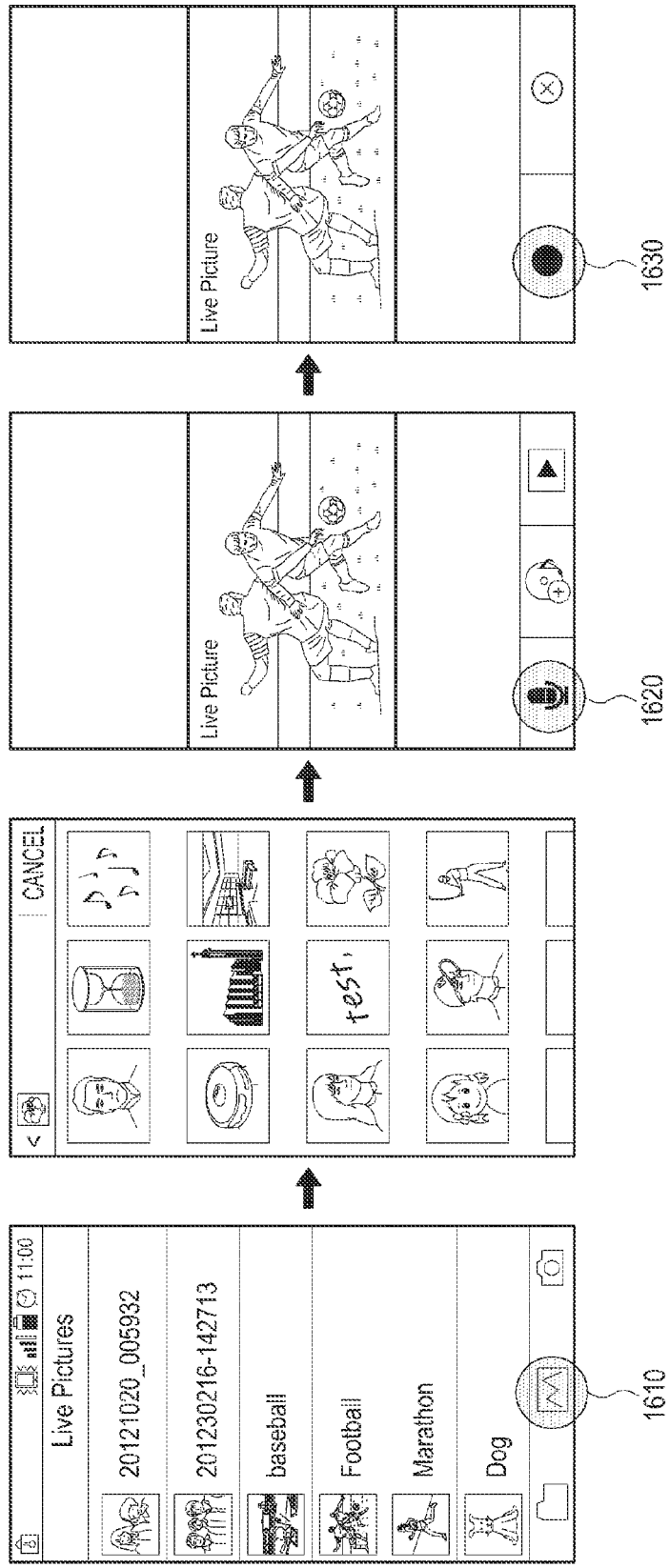

FIG. 16 illustrates an example of configuring a live picture file created according to an embodiment of the present disclosure.

Referring to FIG. 16, when an application providing a live picture file creating function is executed, the live picture file may be created by combining recorded audio data with the already stored general image file as illustrated in FIG. 16.

That is, as illustrated in FIG. 16, images of the already stored live picture files are provided in the form of a thumbnail. At this time, when a file image 1610 is selected on the application execution screen, one or more images already stored in the storage medium are displayed. Accordingly, when the user selects an image, a screen for creating the live picture file with the selected image is provided.

Accordingly, the selected image is displayed on the screen, and recording of an audio signal currently input through a microphone starts when a recording image 1620, which may be displayed on a lower end of the image, is selected. Thereafter, when a preset time elapses or when the user selects a recording end image 1630, the recording ends and the live picture file may be created by combining the recorded audio data with the selected image file.

Figure 17:
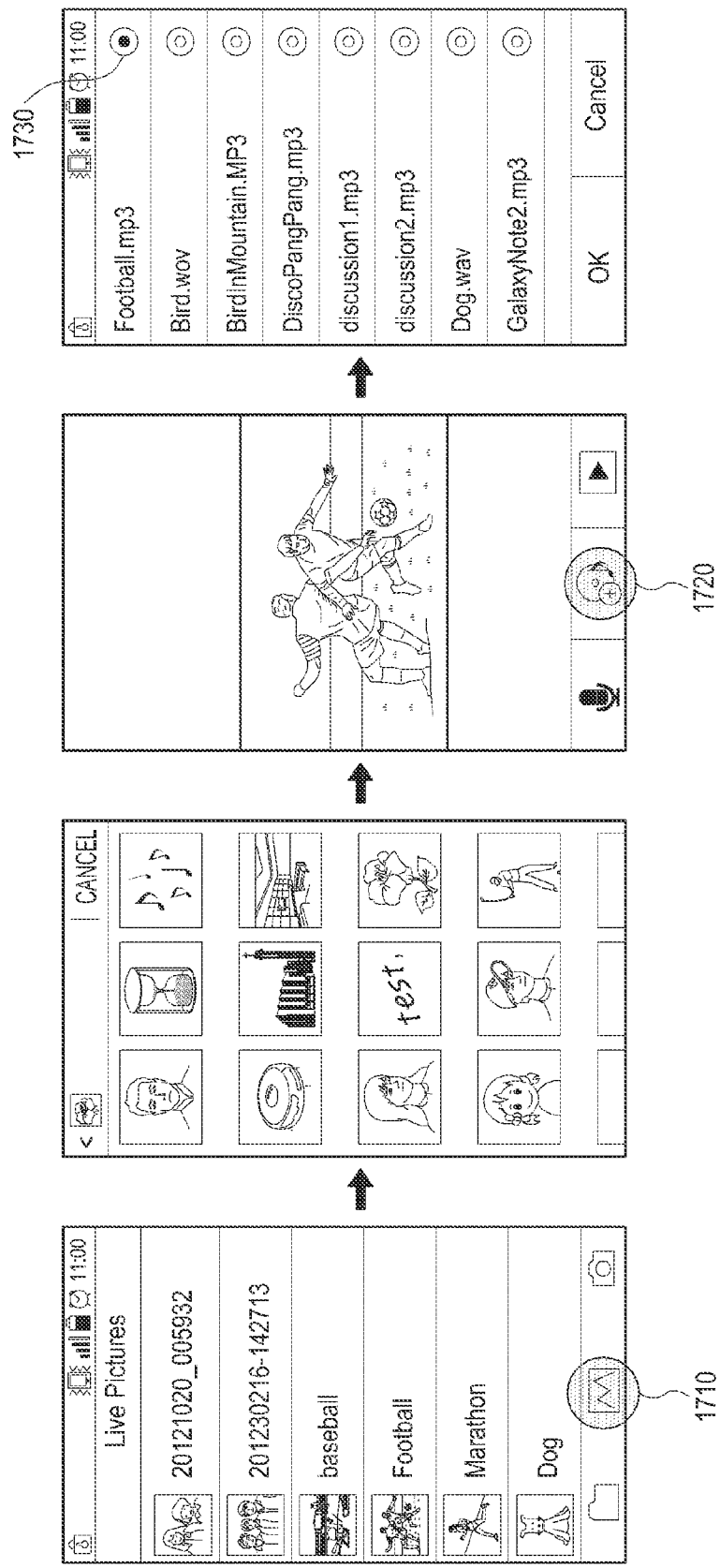

FIG. 17 illustrates a live picture file creating method by using image data and audio data already stored in the storage medium, unlike FIG. 16 in which the live picture file is created using the audio data recorded in the selected image in real time, according to an embodiment of the present disclosure.

Referring to FIG. 17, when an application providing a live picture file creating function is executed, images already stored in the storage medium are provided in the form of thumbnails, as illustrated in FIG. 17. At this time, when the user selects a file image 1710 on the application execution file, one or more images already stored in the storage medium are displayed. Accordingly, when the user selects an image, a screen for creating the live picture file with the selected image is provided.

Accordingly, the selected image is displayed on the screen, and a list of audio files already stored in the storage medium is displayed when an audio data image 1720, which may be displayed on a lower end of the image, is selected. At this time, when the user selects an audio file 1730, the live picture file may be created by combining audio data of the selected audio file 1730 with a file corresponding to the selected image.

Figure 18:
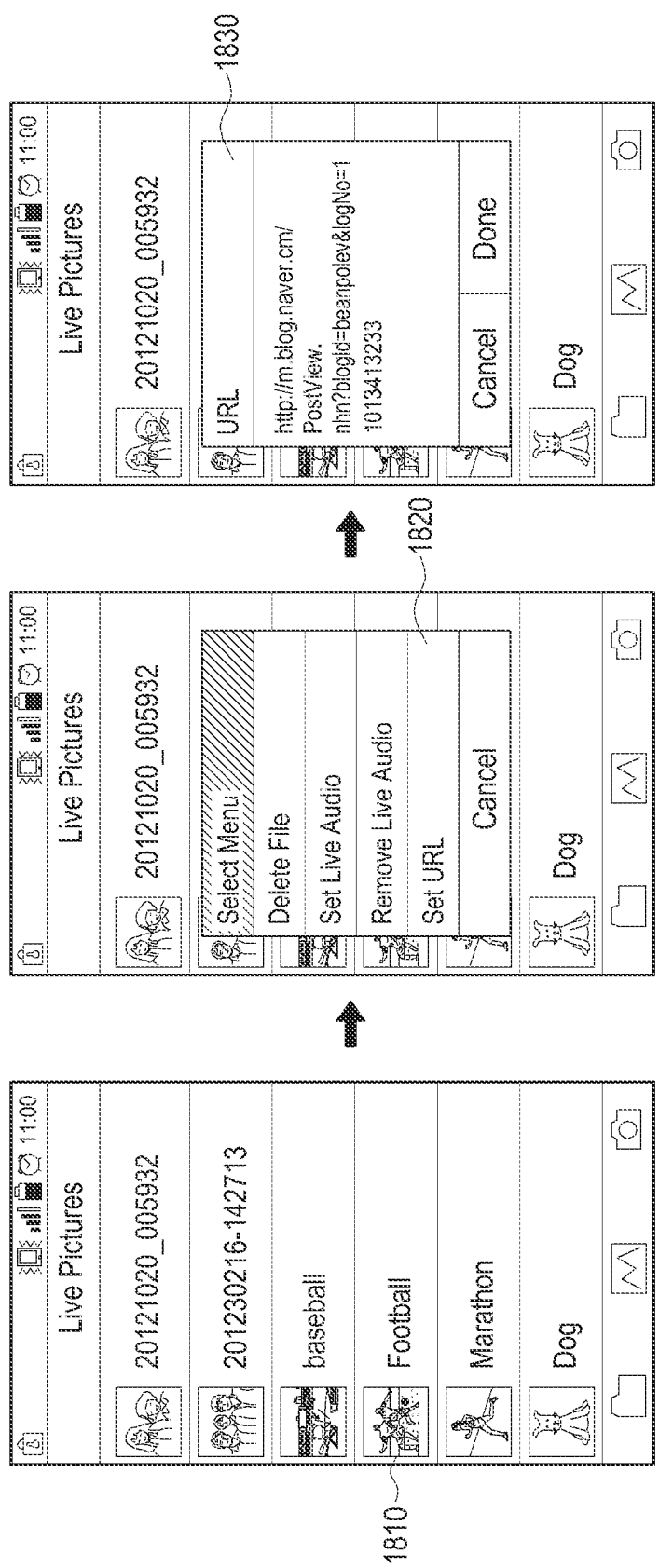

FIG. 18 illustrates a method of adding additional data to the live picture file created as described above according to an embodiment of the present disclosure.

Referring to FIG. 18, when an application providing a live picture file editing function is executed, images of live picture files already stored in the storage medium are provided in the form of thumbnails, as illustrated in FIG. 18. At this time, when the user selects a live picture file 1810 on the application execution screen, for example, the user performs a long click on a corresponding thumbnail image of the selected live picture file 1810, and selects a menu for editing the selected live picture file 1810, a menu 1820 for selecting various additional functions may be displayed in the form of a popup window.

For example, editing functions, such as file deletion, i.e., a Delete File function, audio data setting, i.e., a Set Live Audio function, audio data removal, i.e., a Remove Live Audio function, and hyperlink setting, i.e., a Set URL function, may be provided. At this time, when the hyperlink setting function is executed according to an embodiment of the present disclosure, an input window 1830, into which a hyperlink, for example, Uniform Resource Locator (URL) address, may be input, may be provided as illustrated in FIG. 18. When the user inputs a URL address into the input window 1830, the URL address may be encoded and included in the live picture file as additional data. Accordingly, as described in FIG. 14, a particular webpage included as the additional data may be provided when the live picture file is reproduced.

Figure 19:
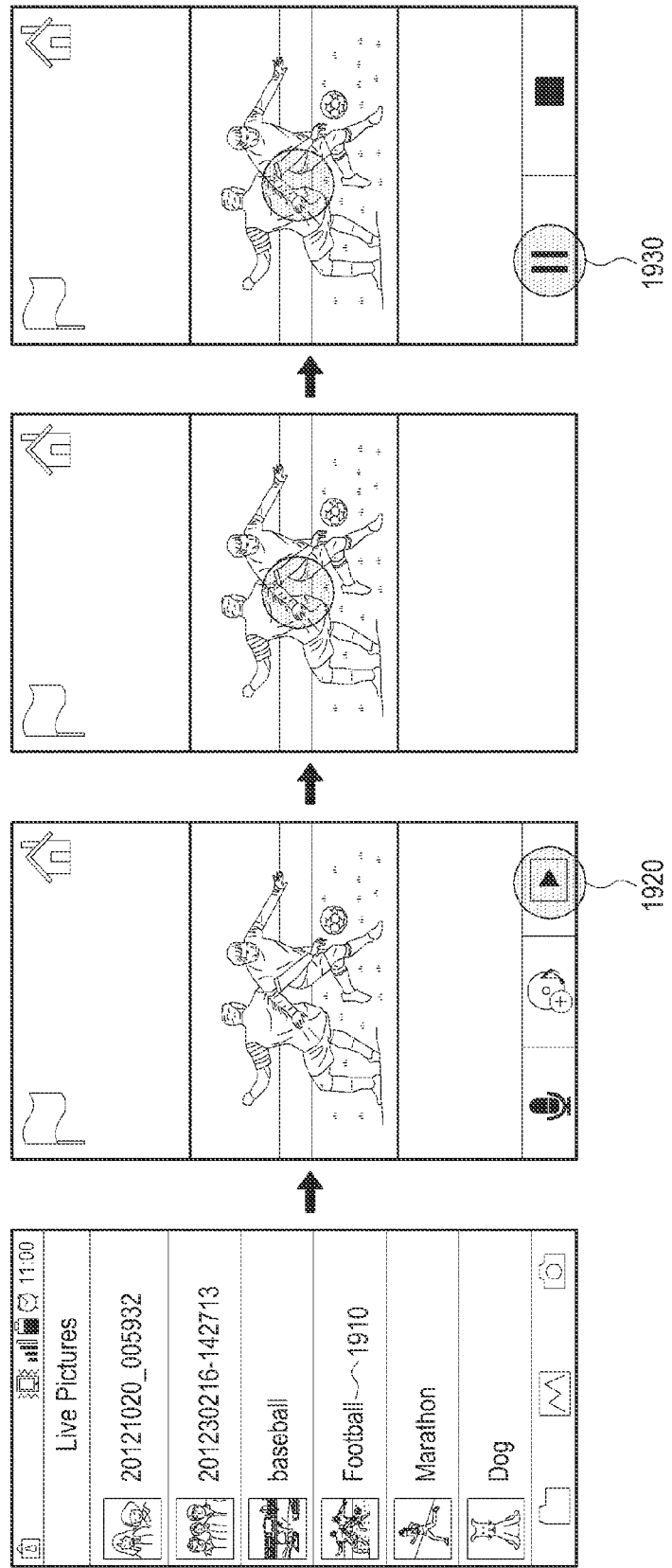
Figure 20:
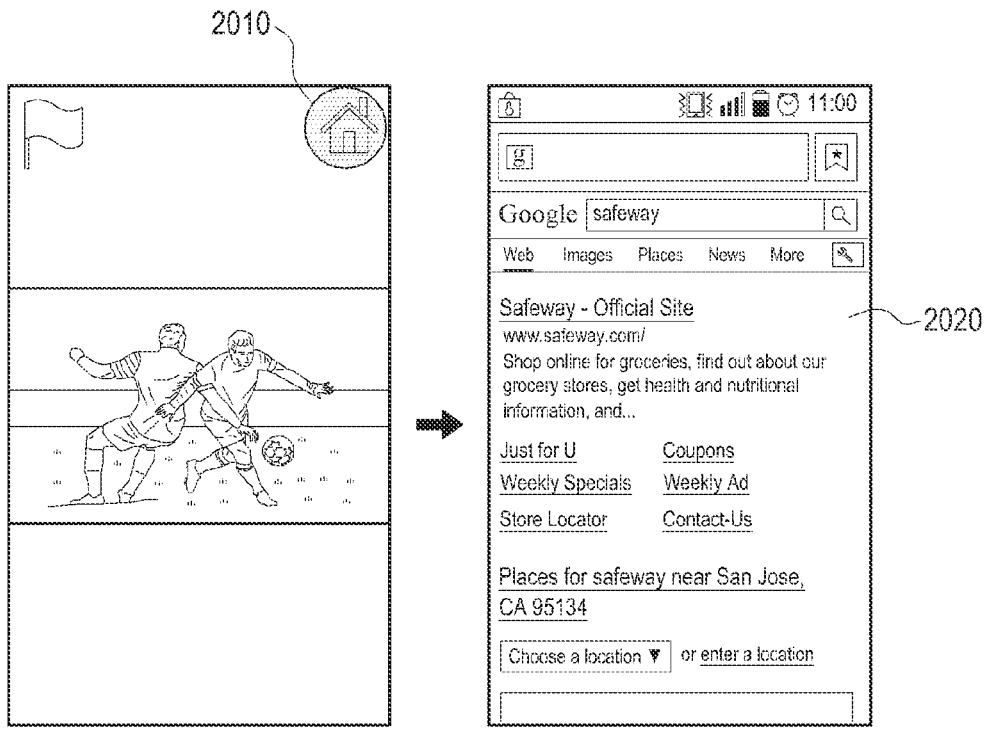
Figure 21:
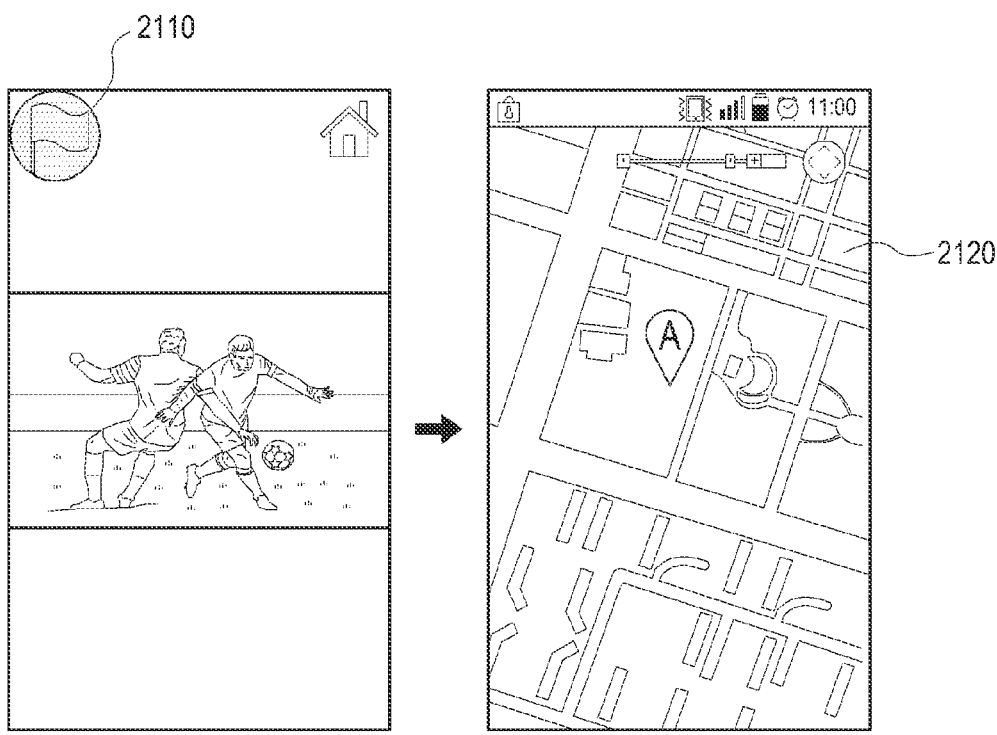

FIGS. 19 to 21 are application execution screens illustrating an embodiment of reproducing the live picture file created as described above according to an embodiment of the present disclosure.

Referring to FIG. 19, when an application providing a live picture file reproducing function is executed, images of live picture files already stored in the storage medium are provided in the form of thumbnails. At this time, when the user selects a live picture file 1910 on the application execution screen, for example, the user performs a long click on a corresponding thumbnail image of the live picture file 1910, the selected live picture file 1910 is decoded and reproduced.

That is, as illustrated in FIG. 19, image data included in the live picture file 1910 is decoded and displayed on the screen, and audio data included in the live picture file 1910 is decoded and output through the speaker or earphone when an audio reproduction button 1920, which may be displayed on a lower end, is selected. Further, when an audio end button 1930 is selected when the audio signal is output, the outputting of the audio signal ends. In another method, while the live picture file 1910 is reproduced, the image may be displayed and the audio data may be automatically reproduced at the same time. Further, such a function may be implemented to be directly changed according to a user's selection.

As described above, more vivid information may be delivered to the user by displaying the image and outputting the recorded audio signal related to the displayed image while the live picture file is reproduced.

Meanwhile, as illustrated in FIGS. 20 and 21, various information included as the additional data may be additionally provided when the live picture file is reproduced.

For example, referring to FIG. 20, an image is displayed and audio data is output at the same time as the live picture file is reproduced. When a hyperlink execution image 2010, which may be displayed on the image, is selected according to an embodiment of the present disclosure, hyperlink data, which is included in the live picture file as the additional data, is decoded and extracted and a webpage 2020 corresponding to the extracted hyperlink data, for example, a URL address, is requested and a website corresponding to the hyperlink data may be browsed on the screen.

Further, referring to FIG. 21, an image is displayed and audio data is output at the same time as the live picture file is reproduced. When a map connection image 2110, which may be displayed on the image, is selected according to an embodiment of the present disclosure, position information, which is included in the corresponding live picture file as the additional data, is decoded and extracted and a geographical position corresponding to the extracted position information is displayed on an electronic map 2120 of the screen.

Application Example

Figure 22:
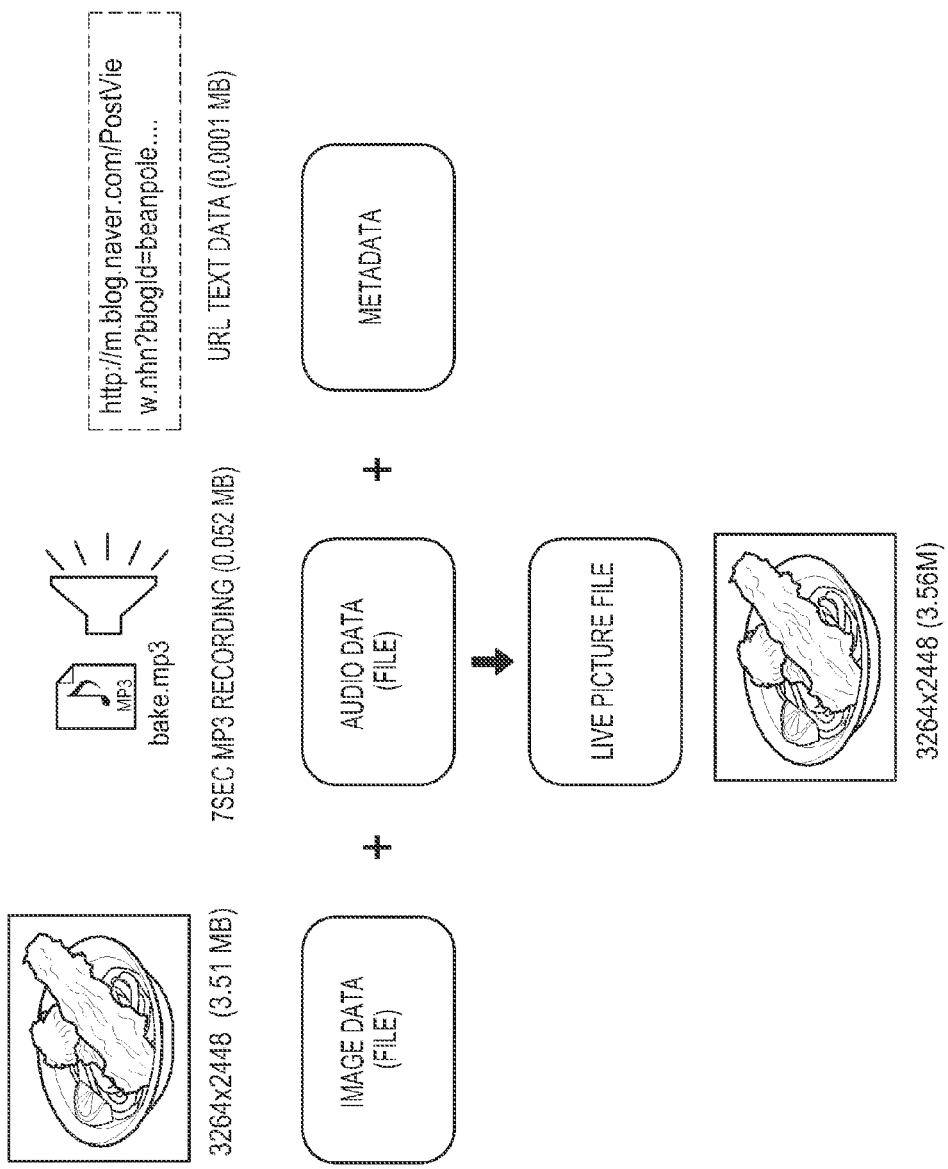
FIG. 22 illustrates an example of configuring a live picture file created according to an embodiment of the present disclosure.

FIG. 22 illustrates an example of configuring the live picture file created according to an embodiment of the present disclosure.

Referring to FIG. 22, for example, when a food image is photographed in a restaurant and a sound, for example, a sound of roasting meat, generated at the scene is recorded at the same time, the live picture file, according to an embodiment of the present disclosure, may be created using the photographed image and the recorded sound. Accordingly, when the user reproduces the created live picture file, the user can hear the sound generated in the scene as well as view the food image, thereby receiving more vivid information. Further, as described above, URL address information of a webpage, such as a blog further including related information, may be further included as metadata of the live picture file.

Meanwhile, as illustrated in FIG. 22, the photographed image data has, for example, a size of 3.51 MB with "3264×2248" pixels and the recorded audio data has a size of 0.052 MB as data reproduced for seven seconds. Further, text data corresponding to the URL address, which is added as the additional data, has a size of 0.0001 MB. Accordingly, when the live picture file, in the form as illustrated in FIGS. 1 to 3, is created, a file of 3.56 MB may be created.

In contrast, when the corresponding image is recorded as a dynamic image, even though only a dynamic image for seven seconds is recorded, a size of the file becomes larger and also resolution of the image deteriorates. Further, when the resolution of the image becomes higher, the size of the dynamic image file is rapidly increased, so that storage, transmission, and management of the file become more difficult in comparison with the live picture file.

FIGS. 23 to 26 illustrate examples of using the live picture file according to an embodiment of the present disclosure. That is, as illustrated in FIGS. 23 to 26, when a picture is taken according to an embodiment of the present disclosure, surrounding environments may be vividly delivered and a voice memo or a writing memo may be added to the taken picture. For example, when the live picture file is created in a baseball park, a game image of the baseball park and a shouting sound of the baseball park may be created as one file. In another example, when scenery of raining day is photographed, a corresponding photographed image and a raining sound may be created as one file.

Further, when the present disclosure is applied to education data, an image containing education contents may be stored in one file together with writing contents, an education memo, and/or a voice explanation. When the present disclosure is applied to a music album, a jacket image produced for music album promotion may be provided as a live picture file together with a sound source for pre-listening which can be listened to in advance during a predetermined section. In addition, the present disclosure may be used after being produced as contents and advertisements for promotion of companies or a broadcasting station.

Figure 23:
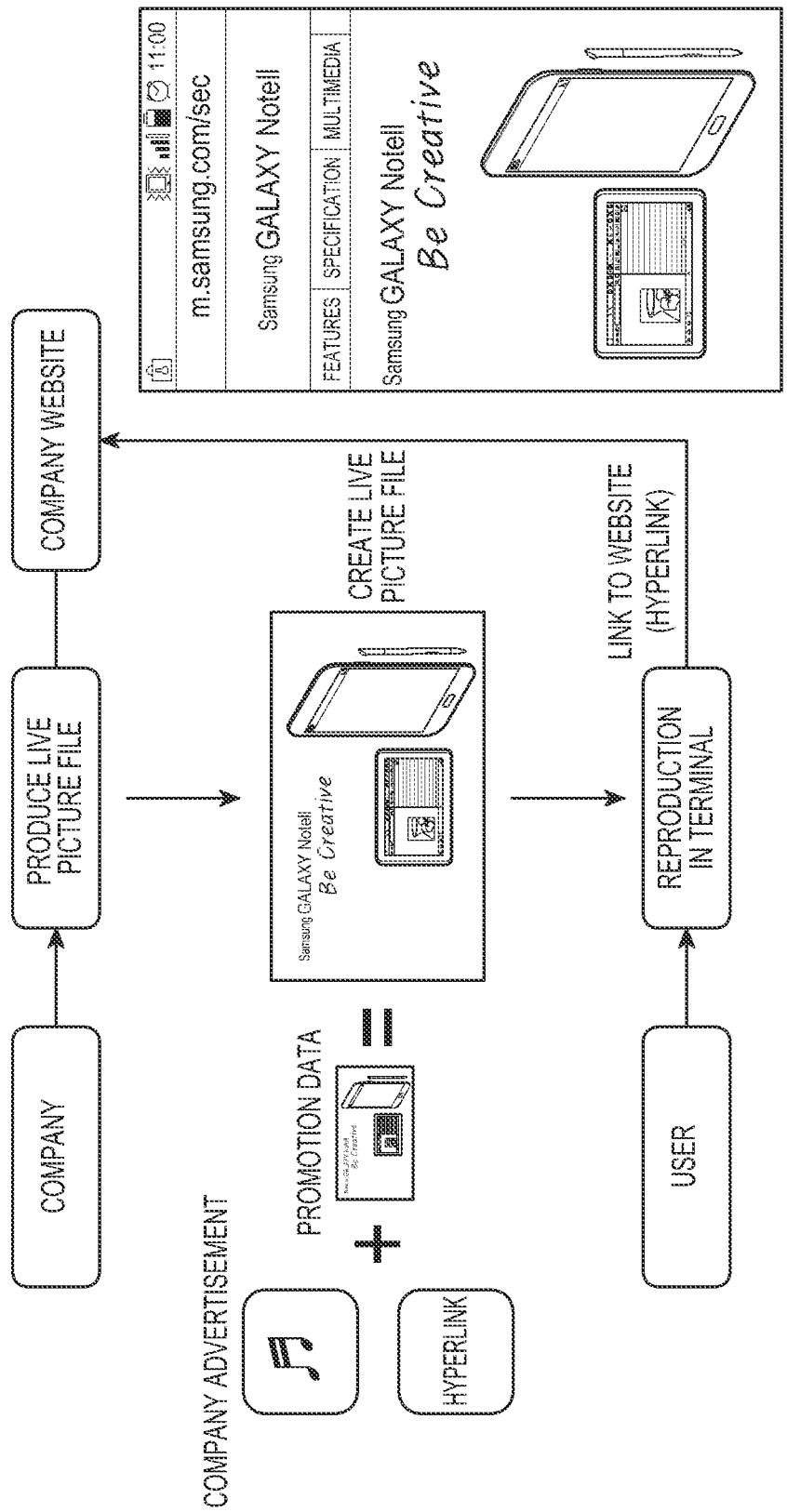
FIGS. 23, 24, 25, and 26 illustrate examples of using a live picture file according to an embodiment of the present disclosure.

Referring to FIG. 23, in a case where a company produces a live picture file, a company advertising audio data and hyperlink information, linking to a company website, may be decoded from a company promotion data image and generated as one live picture file. Accordingly, the company may distribute the live picture file and the user may reproduce the distributed live picture file. Therefore, the user can identify promotion data of the company and listen to explanations about the company through audio data at the same time, and directly access the website of the company.

Figure 24:
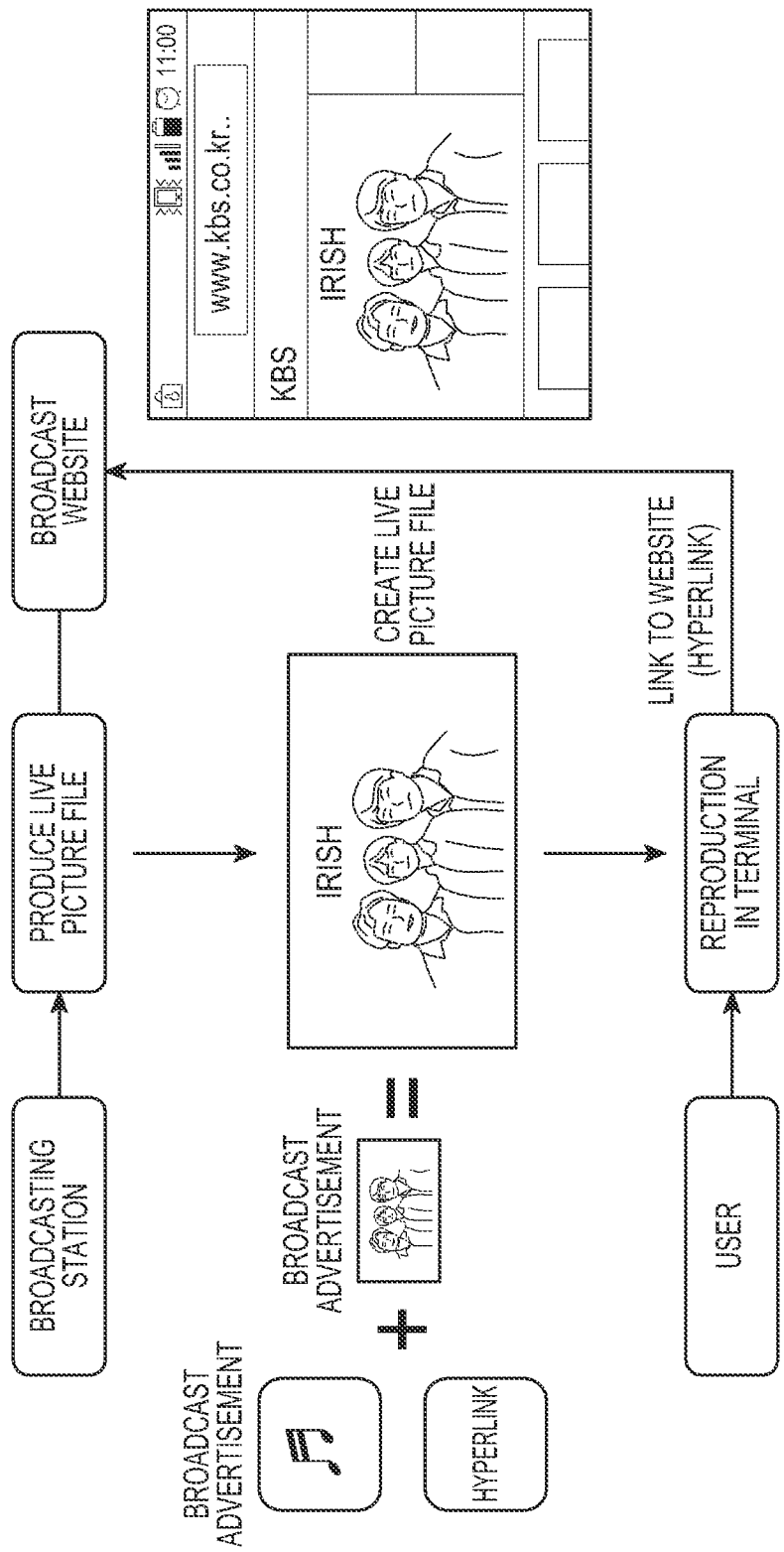

Referring to FIG. 24, in a case where a broadcasting station produces a live picture file, broadcast advertising data and hyperlink information, linking to a broadcasting station website, are decoded from a promotion data image of a broadcast, for example, a soap opera or a movie, and generated as a live picture file. Accordingly, the broadcasting station distributes the live picture file and the user reproduces the distributed live picture file. Therefore, the user can identify promotion data of the corresponding broadcast and listen to explanations about the broadcast through audio data at the same time, and directly access a website of the broadcast.

Figure 25:
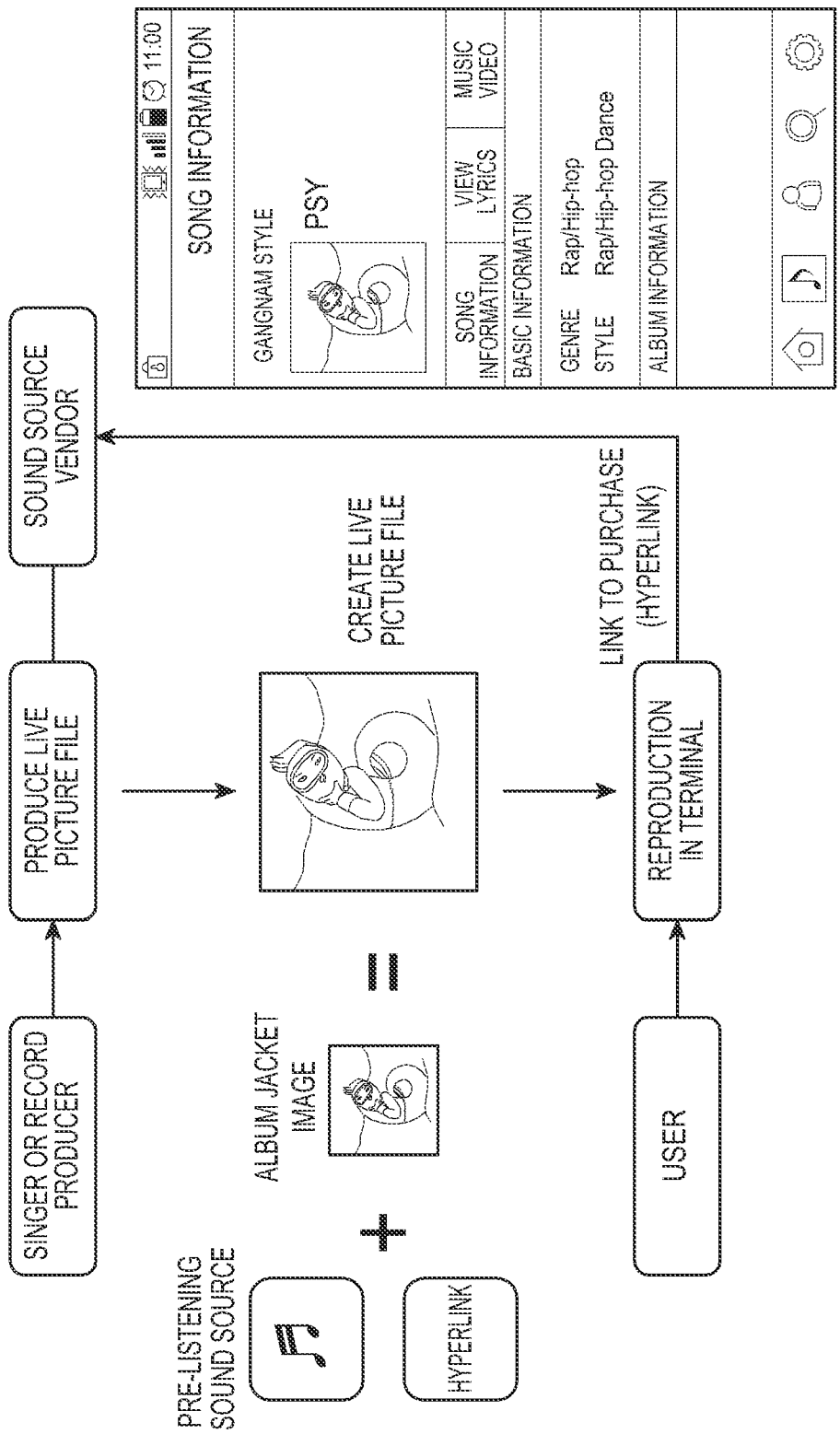

Referring to FIG. 25, in a case where a person, such as a singer or a record producer, produces a live picture file, pre-listening sound source data of a corresponding album and hyperlink information, linking to a sound source sale website from which a user can purchase the corresponding album, may be decoded from a particular music album data image, for example, an album jacket image, and may be generated as a live picture file. Accordingly, when the live picture file is distributed, the user may reproduce the distributed live picture file, and thus may pre-listen to the corresponding album and may directly access the website from which the user can purchase the corresponding album.

Figure 26:
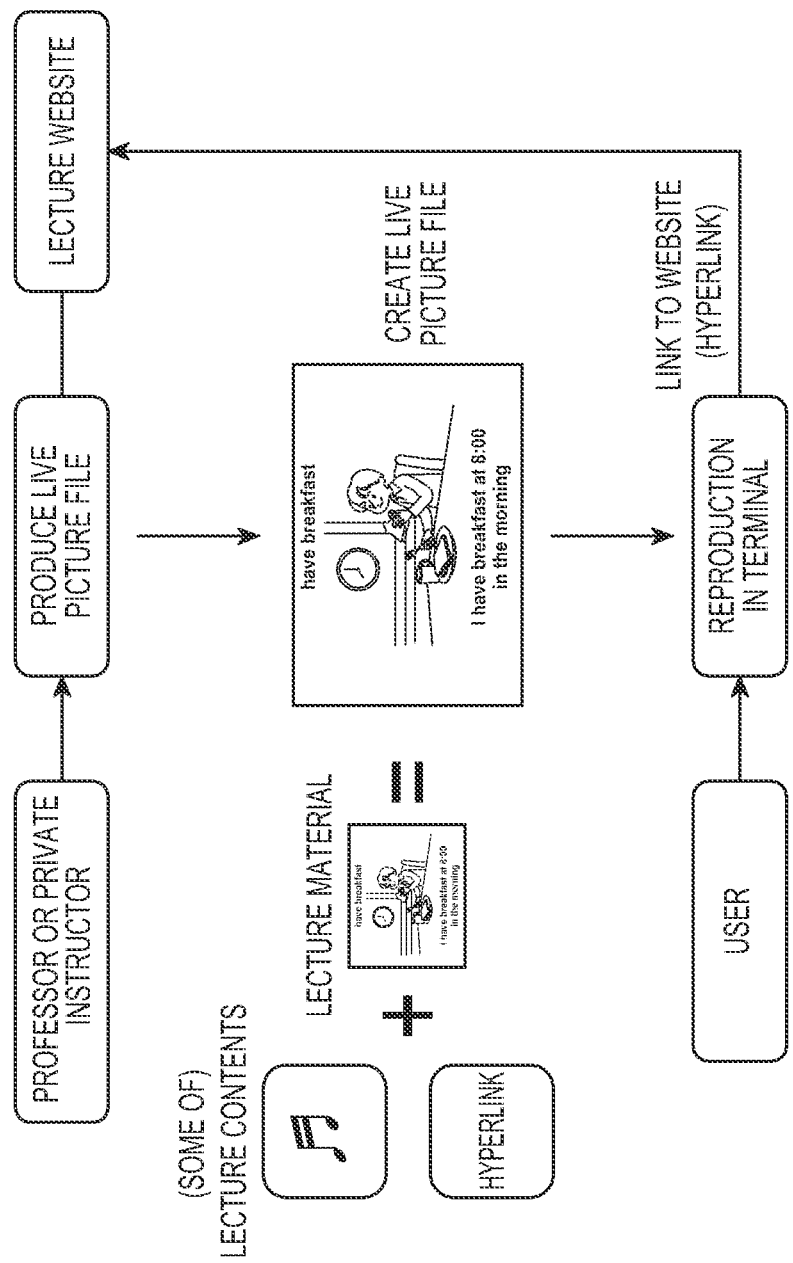

Referring to FIG. 26, in a case where a person, such as a professor or a private instructor, produces a live picture file, audio data, including corresponding lecture contents and hyperlink information, linking to a corresponding lecture website, may be decoded from an educational material image, for example, an English learning image, and may be generated as a live picture file. Accordingly, when the live picture file is distributed, a user, which may be a learner, reproduces the distributed live picture file, and thus can significantly increase an educational effect by identifying corresponding learning contents and an image at the same time through audio data and the learner may directly access to the lecture website from which the learner can listen to the corresponding lecture contents.

As described above, through a live picture file created according to an embodiment of the present disclosure, vivid information having realism may be delivered with a smaller size, such as a smaller data size, a smaller transmission size, a smaller bandwidth size, etc., in comparison with a dynamic image and also various additional services related to image information may be provided as one file, the one file being the live picture file.

As described above, although the present disclosure has been described through elements, the embodiment, and the drawings, they are provided to help overall comprehension of the present disclosure, and the present disclosure is not limited to the above-described elements, the embodiment, and the drawings. It is obvious to those skilled in the art to which the present disclosure pertains that various changes and modifications can be made from such descriptions as described above.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus for creating a live picture file, the apparatus comprising:
    an audio editor configured to edit audio data having a predetermined time length in order to create edited audio data; and
    an encoder configured to encode image data and the audio data edited by the audio editor in order to create a live picture file,
    wherein the live picture file includes only one single image data area including the image data, an additional data header area including information related to additional data including the audio data, and an audio data area including the edited audio data,
    wherein the single image data area comprises a start of image (SOI) field, which is located next to a beginning of the single image data area, and an end of image (EOI) field, which is located next to an end of the single image data area, and
    wherein the additional data header area and the audio data area are provided outside of the single image data area of the live picture file.

2. The apparatus of claim 1, further comprising an audio encryption unit configured to encrypt the edited audio data, wherein the audio data area includes audio data encrypted by the audio encryption unit.

3. The apparatus of claim 1, wherein the live picture file further includes a metadata area including information related to the image data.

4. The apparatus of claim 3, wherein the information related to the image data corresponds to position information related to the image data.

5. The apparatus of claim 3, wherein the metadata area further includes information related to the audio data.

6. The apparatus of claim 3, wherein the metadata area further includes hyperlink data indicating an address corresponding to a webpage.

7. The apparatus of claim 1, wherein the live picture file further includes a user input data area including data input by a user.

8. The apparatus of claim 1, wherein the audio editor is further configured to select a section of an entire audio data, the section including data satisfying a preset standard from among the entire audio data in order to create the edited audio data.

9. The apparatus of claim 1, wherein the audio editor is further configured to remove noise of the audio data in order to create the edited audio data.

10. The apparatus of claim 1, wherein the audio editor is further configured to process a start point of the edited audio data in order for the edited audio data to be faded-in.

11. The apparatus of claim 1, wherein the audio editor is further configured to process an end point of the edited audio data in order for the edited audio data to be faded-out.

12. An apparatus for reproducing a live picture file, the apparatus comprising:

a decoder configured to decode a live picture file, the live picture file including only one single image data area including image data, an additional data header area including information related to additional data including audio data, and an audio data area including the audio data, in order to extract the image data and the audio data; and a live picture reproduction processor configured to, in response to a start of displaying the image data, simultaneously display the image data decoded by the decoder on a screen and output the audio data decoded by the decoder, wherein the single image data area comprises a start of image (SOI) field, which is located next to a beginning of the single image data area, and an end of image (EOI) field, which is located next to an end of the single image data area, and wherein the additional data header area and the audio data area are provided outside of the single image data area of the live picture file.

13. The apparatus of claim 12, further comprising:

an audio decryption unit configured to decrypt the audio data, wherein the audio data area includes encrypted audio data.

14. The apparatus of claim 12, wherein the live picture file further includes a metadata area including information related to the image data.

15. The apparatus of claim 14, wherein the information related to the image data corresponds to position information related to the image data, and wherein a geographical position corresponding to the position information is displayed on an electronic map when the live picture file is reproduced by the live picture reproduction processor.

16. The apparatus of claim 14, wherein the metadata area further includes information related to the audio data.

17. The apparatus of claim 14, wherein the metadata area further includes hyperlink data indicating an address corresponding to a webpage, and wherein the webpage corresponding to the hyperlink data is displayed on a screen when the live picture file is reproduced by the live picture reproduction processor.

18. The apparatus of claim 12, wherein the live picture file further includes a user input data area including data input by a user, and wherein the data input by the user is displayed on a screen when the live picture file is reproduced by the live picture reproduction processor.

* * * * *